United States Patent
Poetsch et al.

(10) Patent No.: US 6,569,505 B2
(45) Date of Patent: May 27, 2003

(54) LIQUID CRYSTAL COMPOUNDS, LIQUID CRYSTAL MEDIUM AND LIQUID CRYSTAL DISPLAY

(75) Inventors: Eike Poetsch, Mühltal (DE); Atsutaka Manabe, Bensheim (DE); Volker Reiffenrath, Rossdorf (DE); Marcus Reuter, Darmstadt (DE); Volker Meyer, Gross-Zimmern (DE); Joachim Krause, Dieburg (DE); Detlef Pauluth, Ober-Ramstadt (DE)

(73) Assignee: Merck Patent Gesellschaft mit Beschränkter Haftung, Darmstadt (DE)

( * ) Notice: Subject to any disclaimer, the term of this patent is extended or adjusted under 35 U.S.C. 154(b) by 113 days.

(21) Appl. No.: 09/773,673

(22) Filed: Feb. 2, 2001

(65) Prior Publication Data

US 2002/0142108 A1 Oct. 3, 2002

(30) Foreign Application Priority Data

Feb. 14, 2000 (EP) .............................. 00102952
May 8, 2000 (EP) .............................. 00109164
Dec. 5, 2000 (EP) .............................. 00126408

(51) Int. Cl.[7] ..................... C09K 19/12; C07C 25/13; C07C 33/28
(52) U.S. Cl. ..................... 428/1.1; 252/299.66; 558/17; 570/127; 430/20
(58) Field of Search .................. 252/299.66, 299.01; 428/1.1; 570/127; 558/17, 18; 430/20

(56) References Cited

FOREIGN PATENT DOCUMENTS

| DE | 4301700 | * | 7/1994 |
| GB | 2290787 | * | 1/1996 |

OTHER PUBLICATIONS

CA 80: 69977 1973.*
CA 79: 74147 1972.*
CA 77:33818 1972.*
CA 75: 19915, 1970.*
CA 71: 69097, 1969.*
CA 68: 114193, 1968.*
Derwnt abstract for DE 4301700, 1994.*

* cited by examiner

*Primary Examiner*—Shean C. Wu
(74) *Attorney, Agent, or Firm*—Millen, White, Zelano & Branigan, P.C.

(57) ABSTRACT

The instant invention relates to liquid crystal media comprising a strongly dielectrically positive component A, preferably comprising isothiocyanate compounds, most preferably compounds of formula I, as given in the text, and a further dielectrically positive component B, preferably comprising terminally polar substituted bi- or terphenyl compounds, most preferably comprising compounds of formula II, as given in the text, further to novel isothiocyanato compounds as well as to liquid crystal displays comprising these media, in particular to PDLC display and most particular to holographic PDLC displays. The instant invention further relates to compounds of formula I

I

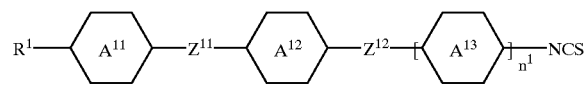

wherein the parameters are as as specified in the text.

27 Claims, No Drawings

LIQUID CRYSTAL COMPOUNDS, LIQUID CRYSTAL MEDIUM AND LIQUID CRYSTAL DISPLAY

FIELD OF THE INVENTION

The present invention relates to liquid crystal compounds, liquid crystal media and to liquid crystal displays comprising these media, in particular to displays of the OCB type and to displays of the composite systems type like PDLCs and most particular amongst these to holographic PDLCs.

PROBLEM TO BE SOLVED AND STATE OF THE ART

Liquid Crystal Displays (LCDs) are widely used to display information. Electro-optical modes employed are e.g. the twisted nematic (TN)-, the super twisted nematic (STN)- and the electrically controlled birefringence (ECB)-mode with their various modifications, as well as others. Besides these modes, which all do use an electrical field, which is substantially perpendicular to the substrates, respectively to the liquid crystal layer, there are also electro-optical modes employing an electrical field substantially parallel to the substrates, respectively the liquid crystal layer like e.g. the in-plane switching (IPS)-mode (compare e.g. DE 40 00 451 and EP 0 588 568).

Besides the various different modes using the liquid crystal medium as such, oriented on surfaces, which typically are pre-treated to achieve uniform alignment of the liquid crystal material, there are applications using composite systems of liquid crystal materials of low molecular weight together with polymeric materials such as e.g. polymer dispersed liquid crystal (PDLC)-, nematic curvilinearily aligned phase (NCAP)- and polymer network (PN)-systems, as disclosed for example in WO 91/05 029. These composite systems typically use an electrical field substantially perpendicular to the composite layer. LCDs are used for direct view displays, as well as for projection type displays. Besides these applications LCDs, especially LCDs comprising composite systems like PDLCs and in particular so called holographic PDLC (HPDLC) systems are used in practical applications. HPDLCs are described e.g. in Date, Takeuchi, Tanaka, and Kato, Journal of the SID 7/1 (1999), p. 17 to 22, which is incorporated by reference. These HPDLC displays are generating three bright colors, preferably primary colors, utilizing Bragg reflection. This technique results in excellent bright colors as it does neither need polarizers, nor color filters. A single layer of the periodic structure of polymer and liquid crystal controls the reflection of one particular color. To realize three primary colors consequently three layers, one for each color are required. Each of the three layers has to be addressed independently. This requires three sets of HPDLC films, each with corresponding electrodes. This large number of layers and corresponding electrodes, which is difficult to realize with a good yield in mass production, can beneficiously be reduced when the "two-frequency" drive method is applied.

For composite systems a high Δn of the liquid crystal used is required in order to achieve an efficiently scattering state and to realize a good contrast. Though there have been proposed PDLC-systems with liquid crystal mixtures with low Δn to improve the so called off axis haze, the predominant problem in most cases is to achieve sufficient contrast in the first place. This is especially the case for PDLC-systems, which are disclosed e.g. in Date, Takeuchi, Tanaka, and Kanto, Journal of the SID 7/1 (1999), p. 17–22. The liquid crystals available typically are characterized by Δn values of up to 0.280 or even up to 0.29. This upper limit, however, is still insufficiently low for many applications.

Further it has so far only been achieved accepting various compromises with respect to the other properties of the liquid crystal mixtures used. The most typical undesired trade-offs are an insufficiently high clearing point, an unfavourably narrow nematic phase range, a rather high temperature for the lower end of the stability of the nematic phase, too low dielectric anisotropy and hence too high operating voltages, unfavourable elastic constants and last not least too high viscosity values or combinations thereof. Good compatibility with the precursors of the polymers of the composite systems and easy phase separation during the formation of the composite systems are obvious prerequisites for liquid crystals for such applications.

Another promising electro-optical mode used in LCDs is the optically compensated bent (OCB) mode. This mode is described e.g. in Yamaguchi et al., "Wide-Viewing-Angle Display Mode for the Active-Matrix LCD Using Bend-Alignment Liquid-Crystal Cell", SID 93, Digest, p. 277 (1993).

This mode is very promising. It is particularly well suited for direct view applications, as it is characterized by a favourable viewing angle dependence. Also the response times are quite short. However for video rate response for the display of changing grey shades the response time still needs to be improved. Compared to a conventional TN display in an OCB displays the amount of deformation of the director is much smaller. Whereas in a TN display the director is oriented almost parallel to the substrates in the unpowered state and changes its direction to almost perpendicular to the substrates upon application of the driving voltage, in an OCB display the director orientation changes to the same final orientation, but starts from an already almost homeotropic bent starting configuraton. Thus, a higher birefringence of the liquid crystal media used is required.

Liquid crystal compounds with a terminal phenyl ring bearing a terminal isothiocyanate group and two F-atoms in ortho position thereto are known from DE 40 27 869.7.

Liquid crystal mixtures consisting predominantly or even entirely of terminally cyano substituted biphenyls and terphenyls are as a rule characterized by suitable high Δε values, but have limited values of Δn and already are likely to show insufficient stability at low temperatures, i.e. in most cases either formation of a smectic phase and or crystallisation. Liquid crystal mixtures using large quantities of halogenated tolane compounds with three phenyl rings, which are almost dielectrically neutral, are disclosed, e.g. in the European Patent Application No. EP 99111782.1 are characterized by comparatively low Δε values which are not suitable for most applications and often even show severe problems with respect to the stability of the nematic phase at low temperatures.

Thus, there is a significant need for liquid crystal media with suitable properties for practical applications such as a wide nematic phase range, low viscosities, appropriate optical anisotropy Δn according to the display mode used especially a suitably high Δn for OCBs and for composite systems like PDLCs and for the latter in particular with suitably large good compatibility with polymer precursors for the composite systems.

SUMMARY OF THE INVENTION

Surprisingly, it now has been found that liquid crystal media with high Δn especially useful for composite systems can be realized which do not exhibit these drawbacks of the materials of the prior art or at least do exhibit them to a significantly lesser degree.

These improved liquid crystal media according to the instant application are realized by using at least two components: a first liquid crystal component (called component A) comprising compounds of formula I, which are strongly dielectrically positive compounds with very high values of Δn

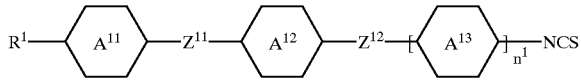

I wherein $R^1$ is n-alkyl, n-alkoxy with 1 to 10 C-atoms, preferably 1 to 7 C-atoms, more preferably 2 to 5 C-atoms, alkenyl, alkenyloxy or alkoxyalkyl with 2 to 7 C-atoms, preferably with 2 to 5 C-atoms or CN, NCS, halogen, preferably F, Cl, halogenated alkyl, halogenated alkenyl or halogenated alkoxy, preferably mono-, di- or oligo-fluorinated alkyl, mono-, di- or oligo-fluorinated alkenyl or mono-, di- or oligo-fluorinated alkoxy, F, Cl, $CF_3$ or $OCF_3$, $CF_3$ $OCF_2H$ or $OCF_3$,

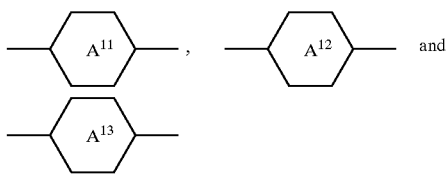

each, independently of each other, are

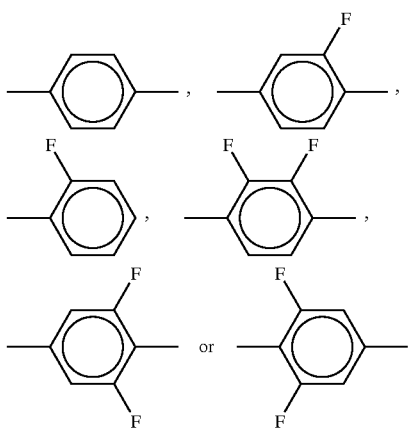

$Z^{11}$ and $Z^{12}$ each, are independently of each other, a single bond or trans —CH=CH—, in case $n^1$ is 0, $Z^{12}$ is a single bond $n^1$ is 0 or 1, preferably

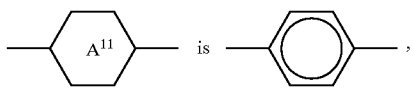

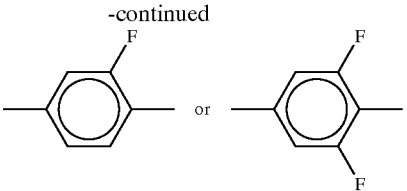

and/or preferably

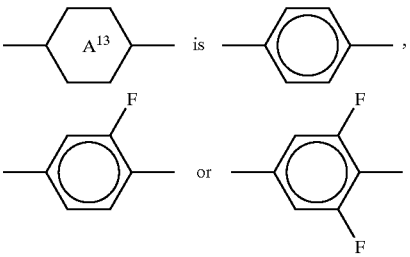

and simultaneously a second liquid crystal component (called component B), which is a dielectrically positive component comprising, and preferably consisting of terminaly polar substituted bi- or terphenyl compounds, optionally some or all of which are laterally fluorinated, preferably of formula II

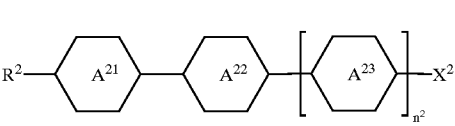

II wherein $R^2$ has the meaning given for $R^1$ under formula I above

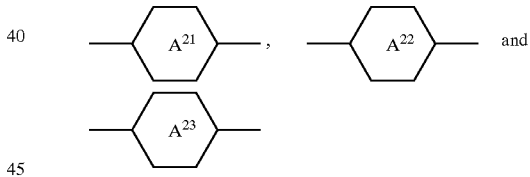

each have the meaning given for

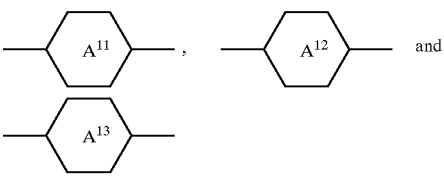

respectively, above under formula I and $x^2$ is CN, F or Cl, preferably CN or Cl, most preferably CN, and $n^2$ is 0 or 1.

Preferably the liquid crystalline media according to the instant invention contain a compound A comprising, preferably predominantly consisting of and most preferably entirely consisting of compounds of formula I.

In addition to the combination of compounds A and B, the compounds of formula I, wherein at least one of $Z^{11}$ and $Z^{12}$ is trans —CH=CH— and/or wherein at least one of the phenyl rings is substituted by at least one fluorine atom or, which is more preferable, at least two fluorine atoms, or; which is also preferred, wherein at least two of the phenyl rings are bearing at least one fluorine atom each are novel and are one aspect of the present invention.

The compounds of formula I, wherein at least one of $Z^{11}$ and $Z^{12}$ is trans —CH=CH—y are prepared from corresponding mesogenic amino compounds. The amino group of these compounds is converted to the isothiocyano group using 1,1-thiocarbonyldiimidazole following the general scheme shown below. Liquid crystal compounds in this application embrace compounds with a liquid crystalline phase by themselves as well as compounds, which are compatible with mesogenic phases, especially with the nematic phase, without decreasing the clearing point unacceptably. The latter compounds have a mesogenic structure and are sometimes called mesogenic compounds.

Scheme I

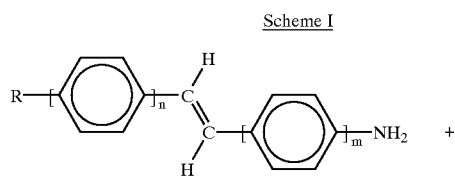

Scheme II

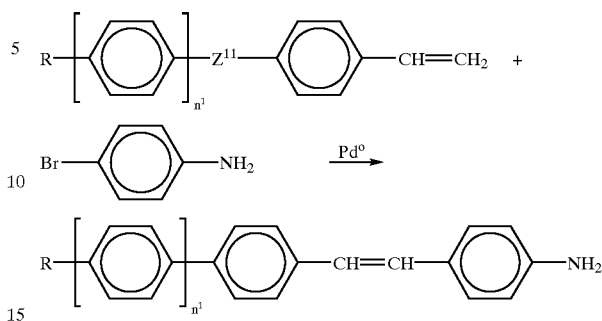

wherein the parameters are defined as in scheme I above.

Compounds of formula I in which $Z^{11}$ and $Z^{12}$ both are a single bond are preferably prepared from the corresponding amino compounds. The amino group of these compounds is converted into the isothiocyanato group by 1,1-thiocarbonyldiimidazole as shown in scheme III.

Scheme III

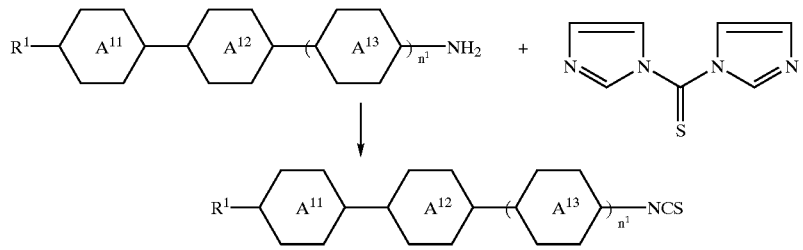

-continued

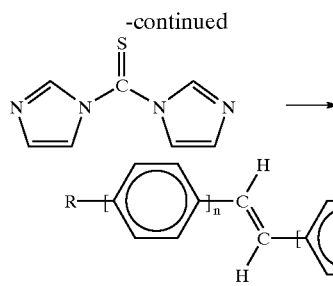

wherein
R is alkyl, alkoxy, alkenyl, alkenyloxy or oxaalkyl,
n and m are independently of each other 1 or 2, preferably n+m is 2 or 3,
and
the phenyl rings present may optionally be substituted by up to two F-atoms, preferably the phenyl ring adjacent to the amino group is fluorinated once or twice, preferably in ortho-position to the amino group.
Compounds of formula I wherein $Z^{11}$ and $Z^{12}$ both are trans —CH=CH— are prepared analoguously. These compounds preferably have $n^1$=1.

The amines are prepared using the so called "Heck"-reaction as shown in scheme II, Wherein the structural parameters have the same meaning as in formula I above.

The amino compounds are advantageously prepared by cross coupling according to scheme IV.

Scheme IV

Comprising in this application means in the context of compositions that the entity referred to, e.g. the medium or the component, contains the compound or compounds in question, preferably in a total concentration of 10% or more and most preferably of 20% or more.

Predominantly consisting, in this context, means that the entity referred to contains 80% or more, preferably 90% or more and most preferably 95% or more of the compound or compounds in question.

Entirely consisting, in this context, means that the entity referred to contains 98% or more, preferably 99% or more and most preferably 100.0% of the compound or compounds in question.

The compounds of formula I are preferably selected from the group of sub-formulae I-1 to I-3

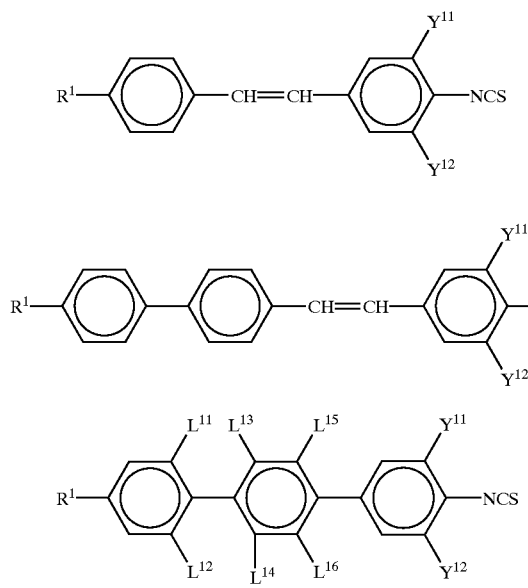

wherein $R^1$ has the meaning given under formula I above $Y^{11}$ and $Y^{12}$ are independently of each other H or F $L^{11}$ to $L^{16}$ are independently of each other H or F, preferably one or two of them are F, the others H.

These compounds of formula I-1 preferably are selected from the group of compounds of sub-formulae I-1a to I-1c

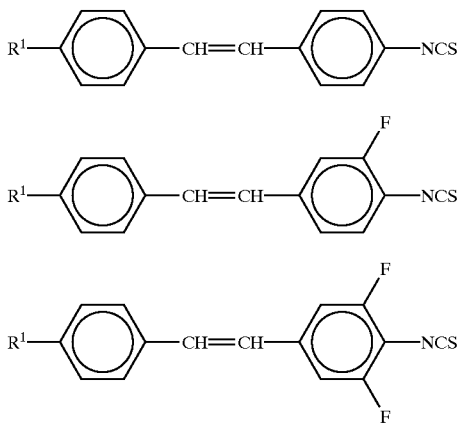

wherein $R^1$ has the meaning given under formula I above and preferably is n-alkyl with 1 to 5 C-atoms or n-alkoxy with 1 to 4 C-atoms, or 1-E-alkenyl with 2 to 5 C-atoms.

The compounds of formula I-2 are selected preferably from compounds of sub-formulae I-2a I-1i, preferably I-2a to I-2c

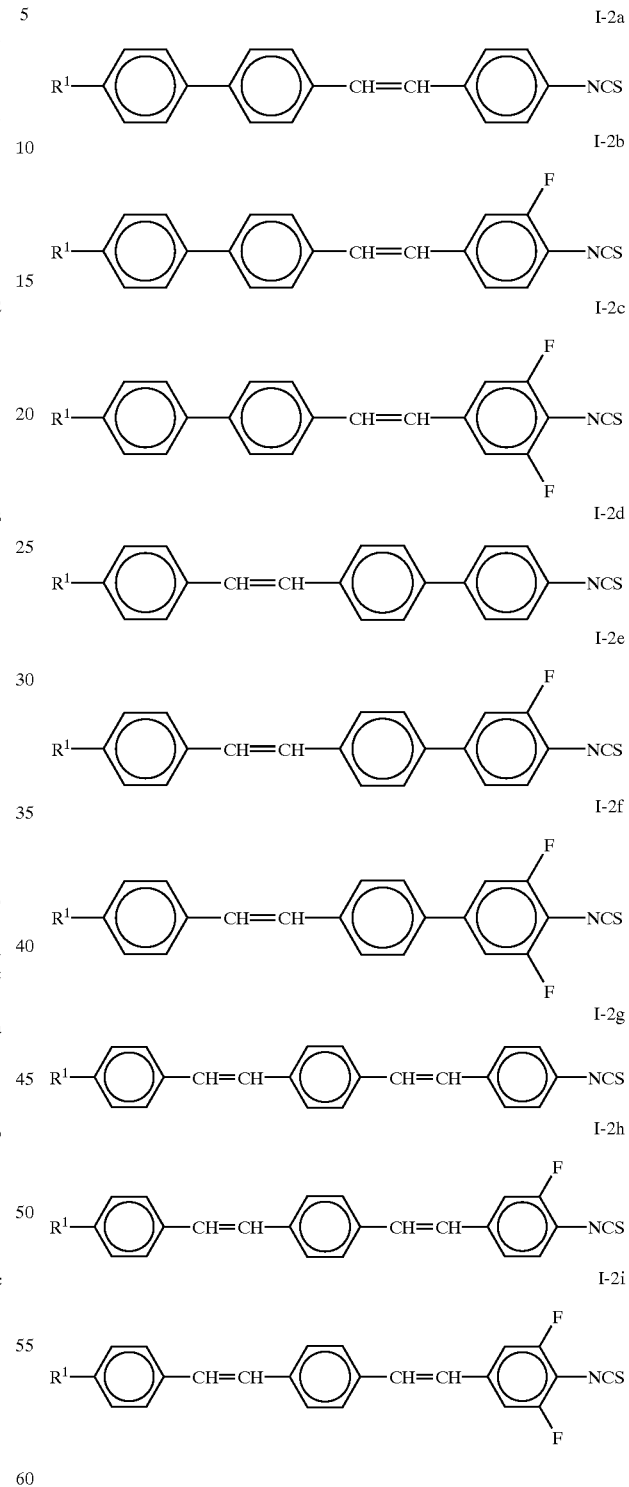

$R^1$ has the meaning given under formula I above and preferably is n-alkyl with 1 to 5 C-atoms or n-alkoxy with 1 to 4 C-atoms, or 1-E-alkenyl with 2 to 5 C-atoms.

The compounds of formula I-3 are preferably selected from compounds of sub-formulae I-3a to I-3d

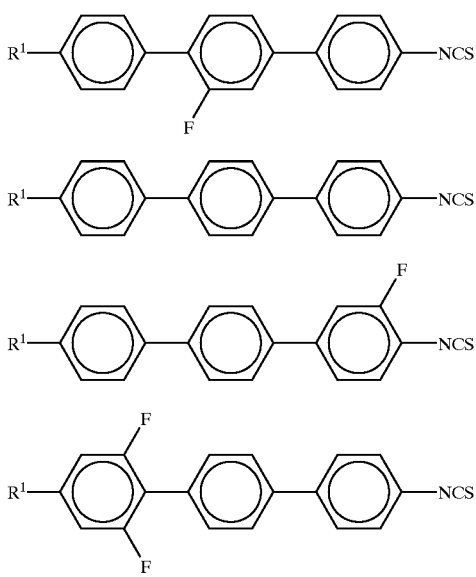

I-3a

I-3b

I-3c

I-3d wherein

R$^1$ has the meaning given under formula I above and preferably is n-alkyl with 1 to 5 C-atoms.

Most prefered are compounds of formulae I-3a and in particular of formula I-3d.

In a preferred embodiment the liquid crystalline media according to the instant invention contains a component B comprising, preferably predominantly consisting of and most preferably entirely consisting of compounds of formula II.

Preferably these compounds of formula II are chosen from the group of compounds of sub-formulae IIa to IIc.

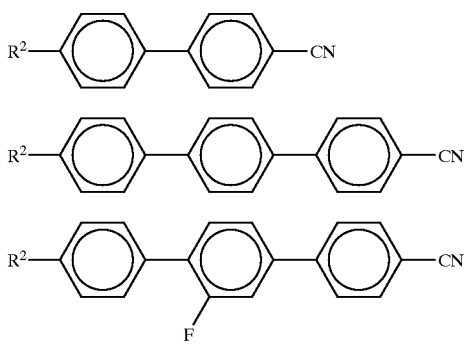

IIa

IIb

IIc wherein

R$^2$ has the meaning given above under formula II and for sub-formula IIa preferably is alkyl or alkoxy and for sub-formulae IIb and IIc preferably alkyl.

In a further preferred embodiment the liquid crystal medium contains a liquid crystal component C which is preferably predominantly consisting of and most preferably entirely consisting of compounds of formula III

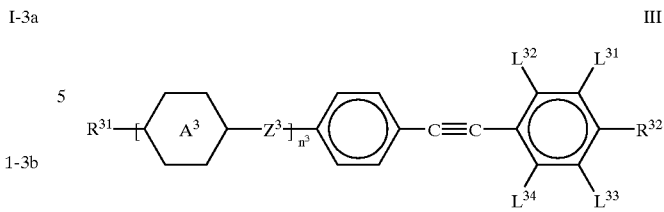

III wherein

R$^{31}$ is alkyl or alkoxy with 1 to 7 C-atoms, alkenyl, alkenyloxy or alkoxyalkyl with 2 to 7 C-atoms, R$^{32}$ is Cl, CN or NCS, R$^{31}$ is preferably n-alkyl, preferably with 3 to 5 C-atoms, or 1-E-alkenyl with 2 to 5 C-atoms, R$^{32}$ is preferably CN or NCS, most preferably NCS,

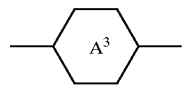

is trans-1,4-cyclohexylene or 1,4-phenylene,

Z$^3$ is —CH$_2$CH$_2$—, —COO—, —C≡C—, —CH=CH— or a single bond, preferably —CH$_2$CH$_2$— or a single bond and L$^{31}$ to L$^{34}$ are independently of each other H or F, preferably up to two of them are H, n$^3$ is 0 or 1.

This component C may be dielectrically neutral or dielectrically negative, depending upon the relative amounts of compounds with different meanings of L$^{31}$ to L$^{34}$.

Preferably one or two of L$^{31}$ to L$^{34}$ are F, preferably L$^{31}$ is F, the others are H, or L$^{31}$ and L$^{33}$ are F or L$^{32}$ and L$^{34}$ are F, all other are H.

Component C is used in a concentration of 0 to 30%, preferably 0 to 20% and most preferably from 0 to 10% of the total mixture.

Optionally the inventive liquid crystal medium contains a further component D, which is a dielectrically neutral component and preferably comprises and more preferably consists of dielectrically neutral compounds of formula IV

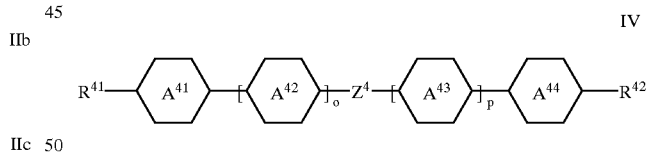

IV wherein

R$^{41}$ and R$^{42}$ are, independently of each other, alkyl or alkoxy with 1 to 7 C-atoms or alkenyl, alkenyloxy or alkoxyalkyl with 2 to 7 C-atoms,

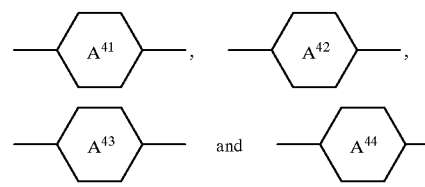

are, independently of each other, trans-1,4-cyclohexylene, 1,4-phenylene, 3-fluoro-1,4-phenylene, 2-fluoro-1,4-phenylene, 2,3-difluoro-1,4- phenylene or 3,5-difluoro-1,4-phenylene, preferably trans-1,4-cyclohexylene, 1,4-phenylene or 3-fluoro-1,4-phenylene, $Z^4$ is —COO—, —CH$_2$CH$_2$—, —CHO— or a single bond, preferably —COO— or a single bond, trans —CH=CH—, —C≡C—, o and p are, independently of each other, 0 or 1.

Component D is used to adjust especially the phase range and the optical anisotropy of the inventive liquid crystal media. Compounds of formula III with o and p both 1 are particularly suited to increase the clearing point of the medium, whereas compounds of formula III with o and p both 0 are particularly suited to decrease the lower limit of the nematic phase range. Especially compounds with $Z^{41}$— C≡C— are useful to adjust Δn of the media.

The concentration of component D in the liquid crystal medium according to the present invention is preferably 0% to 50%, more preferably 0% to 30%, most preferably 0% to 20% and in particular 4% to 16%.

A further optional compound of the liquid crystal media are cyano-substituted trans stilbenes of formula V

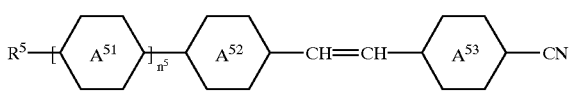

wherein $R^5$ has the meaning given for $R^1$ in formula I above, preferably $R^5$ is n-alkyl or 1-E-alkenyl

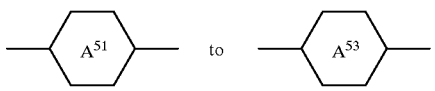

Independently of each other have the meaning given for

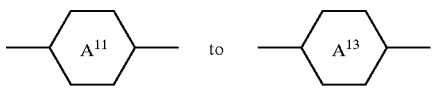

under formula I above, preferably

and if present

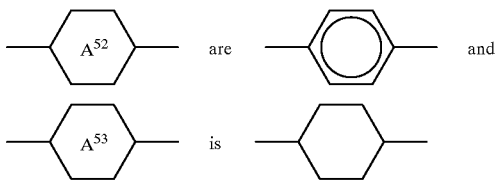

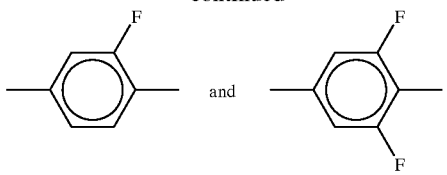

$n^5$ is 0 or 1, preferably 0.

Optionally, the inventive media can comprise further liquid crystal compounds in order to adjust the physical properties. Such compounds are known to the expert. Their concentration in the media according to the instant invention is preferably 0% to 30%, more preferably 0% to 20% and most preferably 5% to 15%.

Preferably the liquid crystal medium contains 50% to 100%, more preferably 70% to 100% and most preferably 80% to 100% and in particular 90% to 100% totally of components A and B which contain, preferably predominantly consist of and most preferably entirely consist of one or more of compounds of formulae I and II respectively.

In a preferred embodiment the liquid crystal media according to the instant application comprise at least one compound of each of the following at least five groups.

Group 1 are compounds with two 6-membered rings, preferably 1,4-phenylene rings, which optionally are fluorinated, each bridged by a trans CH=CH group and a terminal NCS group.

Group 2 are compounds with three 6-membered rings, preferably 1,4-phenylene rings, which are optionally fluorinated, which are directly linked to each other and a terminal NCS group.

Group 3 are compounds with two 6-membered rings, which are directly linked to each other or optionally via a CH=CH bridge and which bear a terminal cyano group.

Group 4 are compounds with three 6-membered rings, preferably 1,4-phenylene rings, which are directly linked to each other and having a terminal cyano group.

Group 5 are compounds with two 6-membered rings, which are directly linked and bear a terminal NCS group.

The concentration ranges, in which these groups of compounds are used in the liquid crystal media are as follows:

| Group | Preferably | in particular |
|-------|-----------|---------------|
| 1 | 5 to 40% | 10 to 30% |
| 2 | 5 to 30% | 10 to 25% |
| 3 | 5 to 40% | 15 to 35% |
| 4 | 5 to 40% | 10 to 30% |
| 5 | 5 to 40% | 15 to 30% |

The liquid crystalline media according to the instant invention are preferably characterized by a clearing point above 80° C., more preferably of 90° C. or more, especially preferred of 100° C. or more, most preferred of 110° C. or more and in particular of 120° C. or more.

The Δn of the liquid crystalline media according to the instant invention is preferably 0.25 or more, more preferably from 0.30 to 0.65, further preferably from 0.32 to 0.60, most preferably from 0.33 to 0.48 and in particular from 0.35 to 0.55.

In a preferred embodiment of the instant onvention the Δn of the liquid crystalline media is preferably from 0.30 to 0.60, more preferably from 0.32 to 0.50, most preferably from 0.33 to 0.45 and in particular from 0.35 to 0.40.

The Δε, at 1 kHz and 20° C., of the liquid crystal medium according to the invention is preferably 6 or more, more preferably 10 or more, most preferably 15 or more and in particular 19 or more.

The liquid crystal media of the state of the art have been limited by low $\Delta\epsilon$ values at high $\Delta n$ values and vice versa. In contrast, the inventive media have pairs of ($\Delta n$, $\Delta\epsilon$), which are above a line passing through the points (0.290, 18.0) and (0.370, 4.0) in a plot of $\Delta\epsilon$ as a function of $\Delta n$ of the same medium. Preferably they are above a line through (0.290, 20.0) and (0.370, 6.0), most preferably above a line through (0.310, 20.0) and (0.370, 8.0) and in particular above a line through (0.350, 18.0) and (0.390, 8.0).

Preferably the nematic phase of the inventive media extends at least from 0° C. to 70° C., more preferably at least −20° C. to 70° C. and most preferably at least from −30° C. to 80° C., wherein at least means that preferably the lower limit is under cut, wherein the upper limit is surpassed.

In the present application the term dielectrically positive compounds describes compounds with $\Delta\epsilon>1.5$, dielectrically neutral compounds are compounds with $-1.5 \leq \Delta\epsilon \leq 1.5$ and dielectrically negative compounds are compounds with $\Delta\epsilon<-1.5$. The same holds for components. $\Delta\epsilon$ is determined at 1 kHz and 20° C. The dielectrical anisotropies of the compounds is determined from the results of a solution of 10% of the individual compounds in a nematic host mixture. The capacities of these test mixtures are determined both in a cell with homeotropic and with homogeneous alignment. The cell gap of both types of cells is approximately 10 μm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany can be used as host mixtures, respectively. The dielectric permittivities of the compounds are determined from the change of the respective values of the host mixture upon addition of the compounds of interest and are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$, also called Freedericksz-threshold $V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status Nov. 1997, Merck KGaA, Germany and are given for a temperature of 20° C., unless explicitly stated otherwise. The optical anisotropy ($\Delta n$) is determined at a wavelength of 589.3 nm. The dielectric anisotropy ($\Delta\epsilon$) is determined at a frequency of 1 kHz. The threshold voltages, as well as all other electro-optical properties have been determined with test cells prepared at Merck KGaA, Germany. The test cells for the determination of $\Delta\epsilon$ had a cell gap of 22 μm. The electrode was a circular ITO electrode with an area of 1.13 cm² and a guard ring. The orientation layers were lecithin for homeotropic orientation ($\epsilon_\parallel$) and polyimide AL-1054 from Japan Synthetic Rubber for homogeneuous orientation ($\epsilon_\perp$).

The capacities were determined with a frequency response analyser Solatron 1260 using a sine wave with a voltage of 0.3 $V_{rms}$. The light used in the electro-optical measurements was white light. The set up used was a commercially available equipment of Otsuka, Japan. The characteristic voltages have been determined under perpendicular observation. The threshold ($V_{10}$)— mid grey ($V_{50}$)— and saturation ($g_{90}$) voltages have been determined for 10%, 50% and 90% relative contrast, respectively.

The liquid crystal media according to the present invention can contain further additives and chiral dopants in usual concentrations. The total concentration of these further constituents is preferably from 0% to 10%, more preferably 0.1% to 6%, based on the total mixture. The concentrations of the individual compounds used each are preferably from 0.1 to 3%. The concentration of these and of similar additives is not taken into consideration for the values and ranges of the concentrations of the liquid crystal components and compounds of the liquid crystal media in this application.

The inventive liquid crystal media according to the present invention may consist of several compounds, preferably of 3 to 30, more preferably of 5 to 20 and most preferably of 6 to 14 compounds. These compounds are mixed in conventional way. Generally, the required amount of the compound used in the smaller amount is dissolved in the compound used in the greater amount. In case the temperature is above the clearing point of the compound used in the higher concentration, it is particularly easy to observe completion of the process of dissolution. It is, however, also. possible to prepare the media by other conventional ways, e.g. using so called pre-mixtures, which can be e.g. homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB-, VAN-AMD and in particular in composite systems, like PDLC-, NCAP- and PN-LCDs and especially in HPDLCs.

The melting point T(C,N), the transition from the smectic (S) to the nematic (N) phase T(S,N) and the clearing point T(N,l) of the liquid crystals are given in degrees centigrade.

The entire disclosure of all applications, patents and publications, cited above and below, and of corresponding European Application No. EP 00102952.9, filed Feb. 14, 2000; European Application No. EP 00109164.4, filed May 8, 2000; and European Application No. EP 1026408.4, filed Dec. 5, 2000, are hereby incorporated by reference.

In the present application and especially in the following examples, the structures of the liquid crystal compounds are represented by abbreviations also called acronyms. The transformation of the abbreviations into the corresponding structures is straight forward according to the following two tables A and B. All groups $C_nH_{2n+1}$ and $C_mH_{2m+1}$ are straight chain alkyl groups with n respectively m C-atoms. The interpretation of table B is self evident. Table A does only list the abbreviations for the cores of the structures. The individual compounds are denoted by the abbreviation of the core followed by a hyphen and a code specifying the substituents $R^1$, $R^2$, $L^1$ and $L^2$ follows:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |

-continued

| Code for R¹, R², L¹, L² | R¹ | R² | L¹ | L² |
|---|---|---|---|---|
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nN.F.F | $C_nH_{2n+1}$ | CN | F | F |
| nF | $C_nH_{2n+1}$ | F | H | H |
| nF.F | $C_nH_{2n+1}$ | F | H | F |
| nF.F.F | $C_nH_{2n+1}$ | F | F | F |
| nOF | $OC_nH_{2n+1}$ | F | H | H |
| nCl | $C_nH_{2n+1}$ | Cl | H | H |
| nCl.F | $C_nH_{2n+1}$ | Cl | H | F |
| nCl.F.F | $C_nH_{2n+1}$ | Cl | F | F |
| nCF₃ | $C_nH_{2n+1}$ | $CF_3$ | H | H |

-continued

| Code for R¹, R², L¹, L² | R¹ | R² | L¹ | L² |
|---|---|---|---|---|
| nOCF₃ | $C_nH_{2n+1}$ | $OCF_3$ | H | H |
| nOCF₃.F | $C_nH_{2n+1}$ | $OCF_3$ | H | F |
| nOCF₃.F.F | $C_nH_{2n+1}$ | $OCF_3$ | F | F |
| nOCF₂ | $C_nH_{2n+1}$ | $OCHF_2$ | H | H |
| nOCF₂.F | $C_nH_{2n+1}$ | $OCHF_2$ | H | F |
| nOCF₂.F.F | $C_nH_{2n+1}$ | $OCHF_2$ | F | F |
| nS | $C_nH_{2n+1}$ | NCS | H | H |
| nS.F | $C_nH_{2n+1}$ | NCS | H | F |
| nS.F.F | $C_nH_{2n+1}$ | NCS | F | F |
| rVsN | $C_rH_{2r+1}-CH=CH-C_sH_{2s}-$ | CN | H | H |
| rEsN | $C_rH_{2r+1}-O-C_sH_{2s}-$ | CN | H | H |

TABLE A

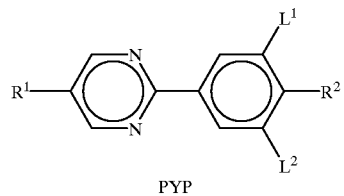

PYP

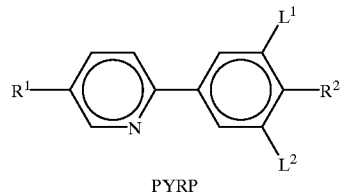

PYRP

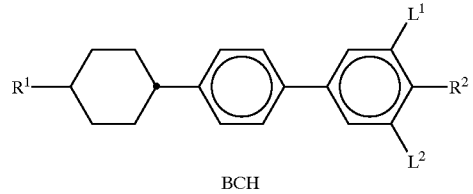

BCH

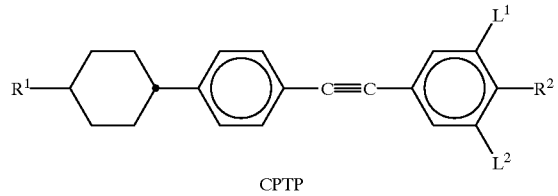

CPTP

TABLE A-continued
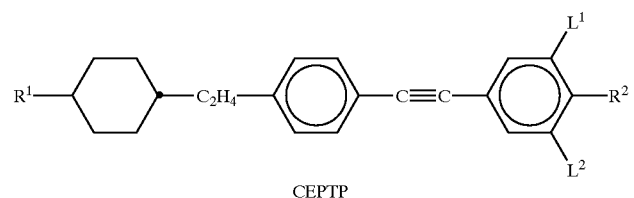
CEPTP
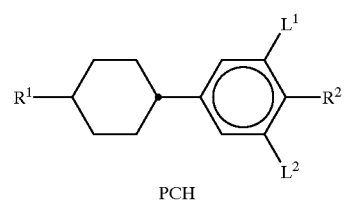
PCH
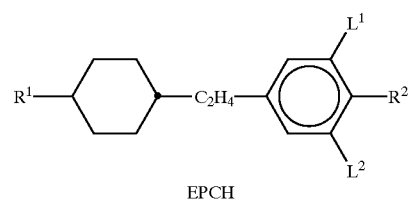
EPCH
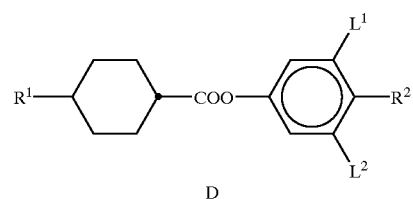
D
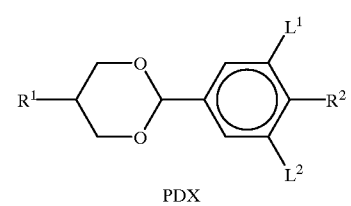
PDX
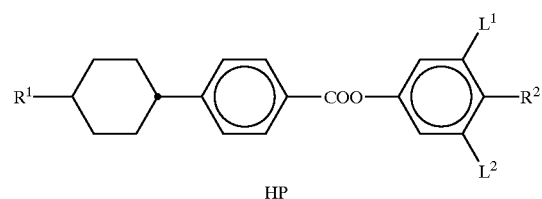
HP
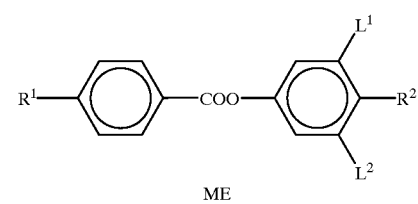
ME TABLE A-continued
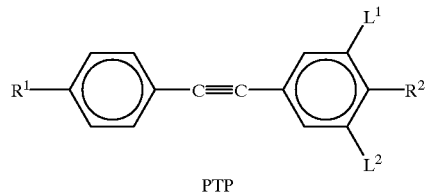
PTP
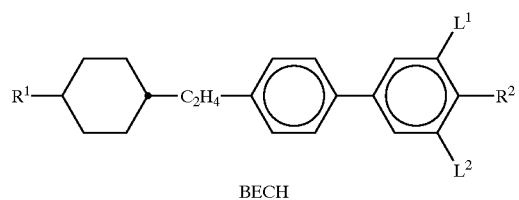
BECH
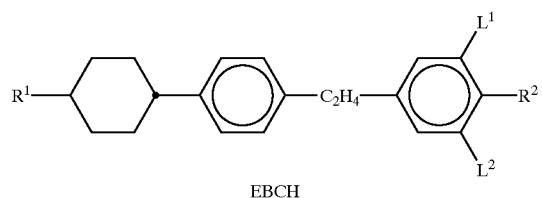
EBCH
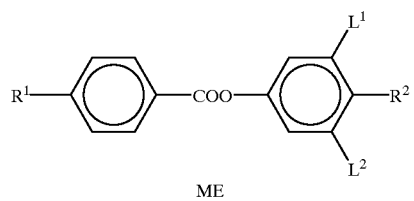
ME
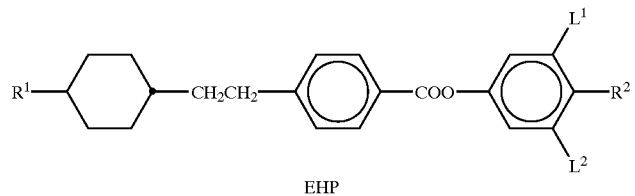
EHP
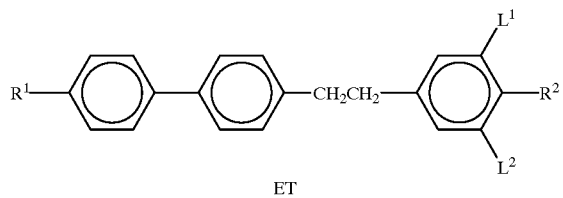
ET TABLE B
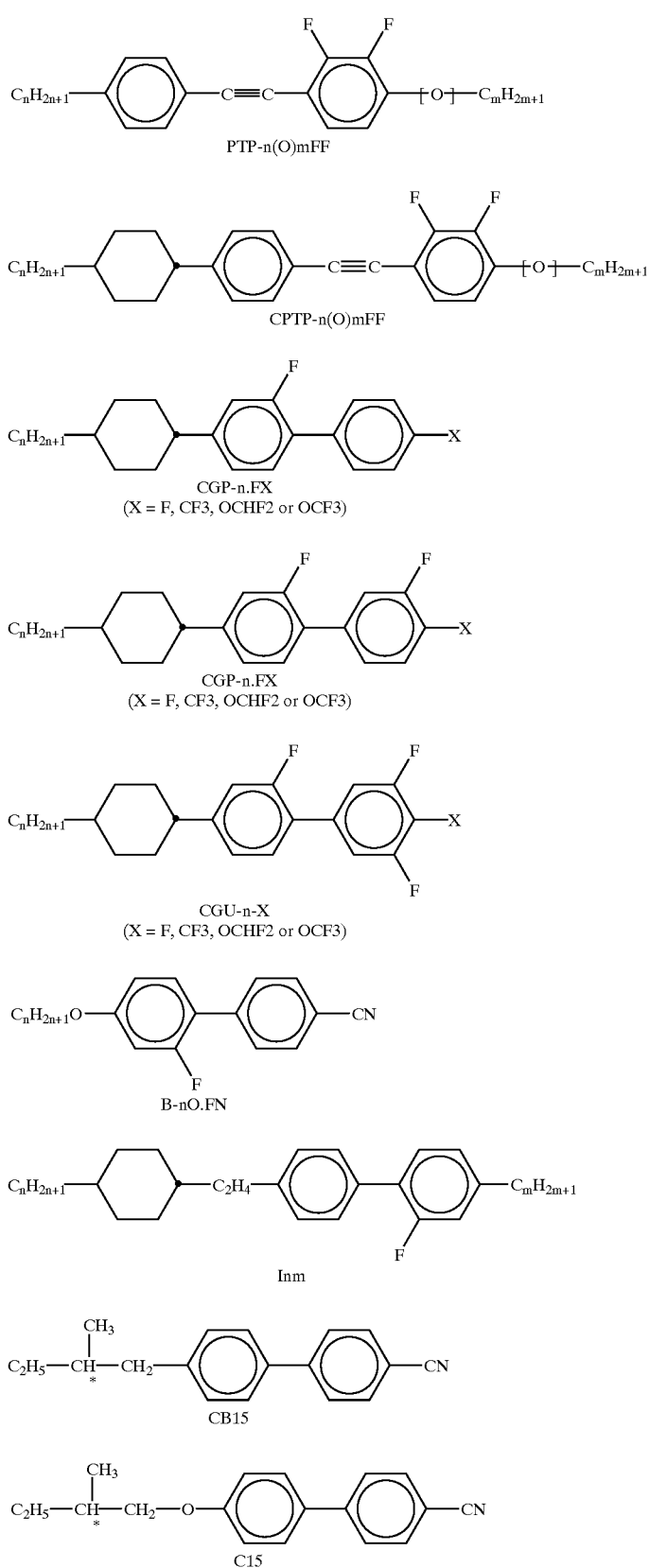

TABLE B-continued
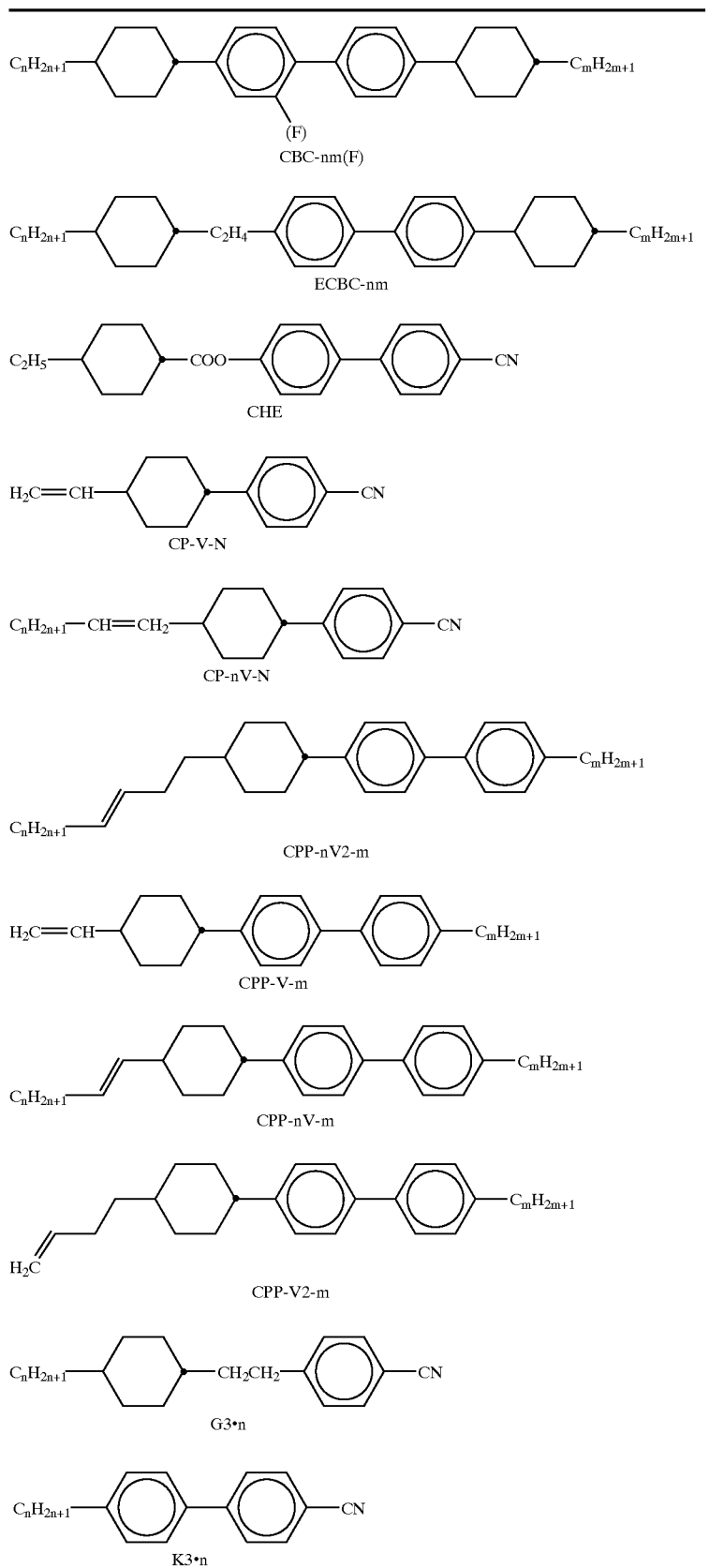

TABLE B-continued
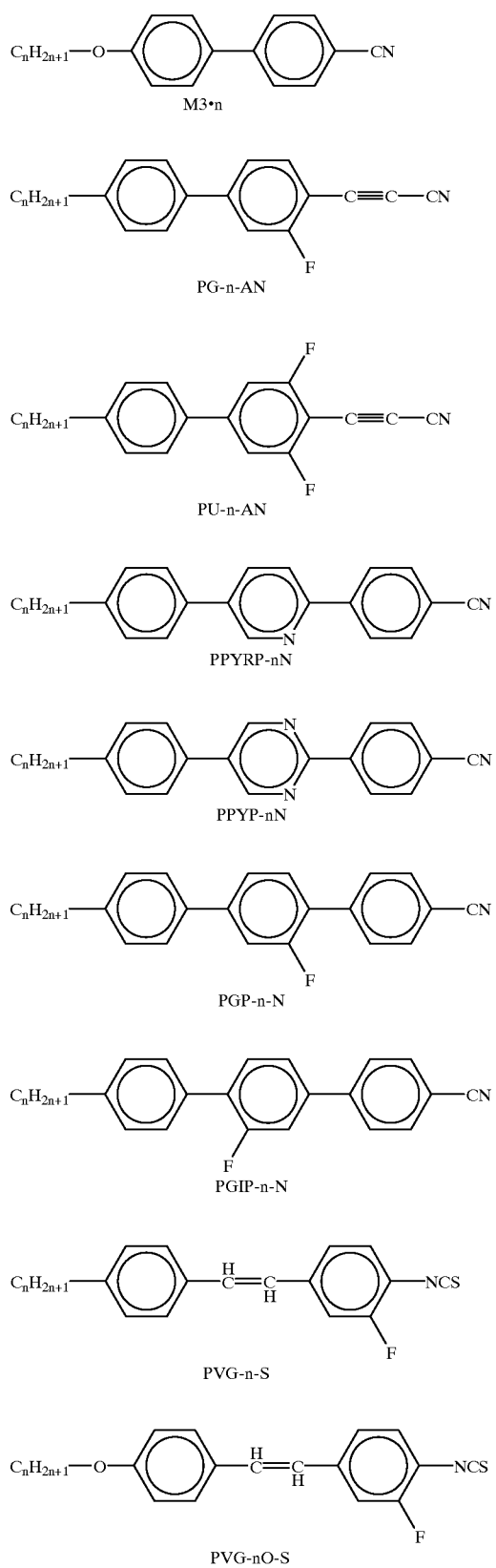

TABLE B-continued
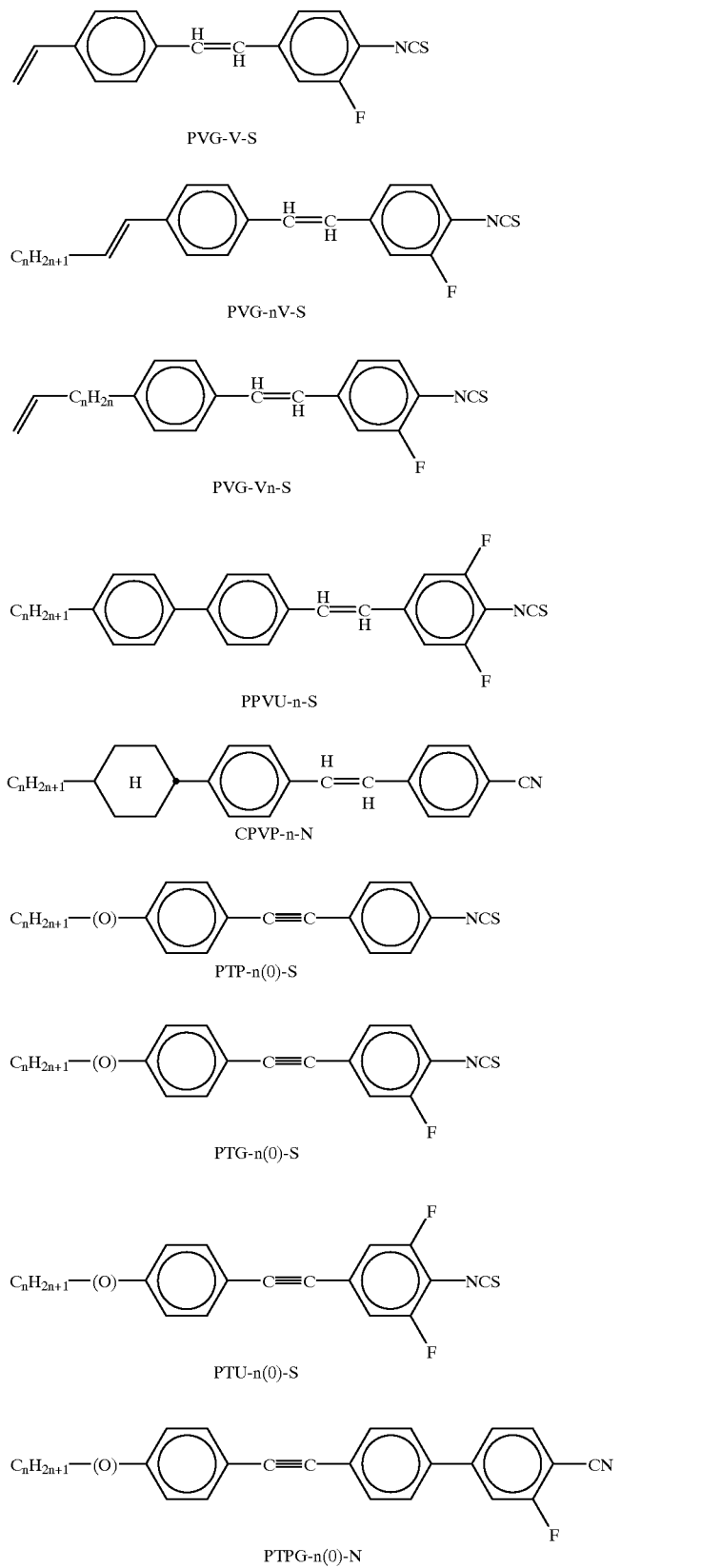

TABLE B-continued
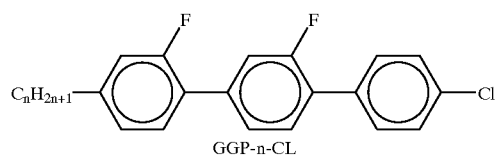
GGP-n-CL
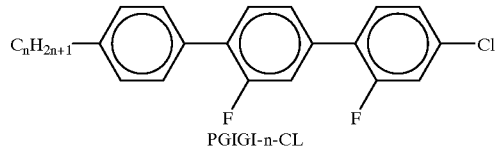
PGIGI-n-CL
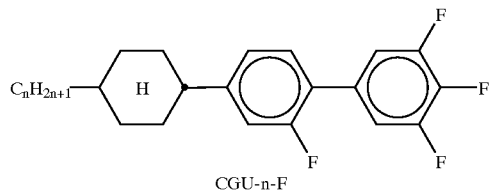
CGU-n-F
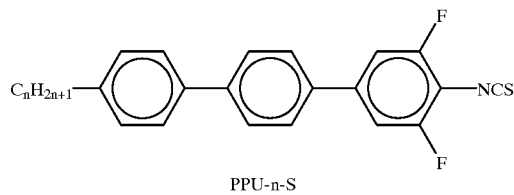
PPU-n-S
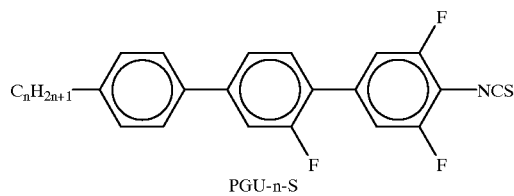
PGU-n-S
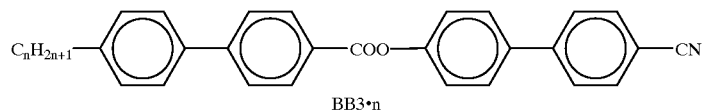
BB3·n
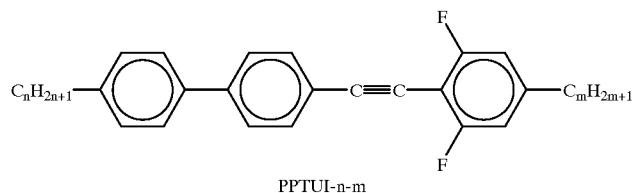
PPTUI-n-m The liquid crystal media according to the instant invention do contain preferably four or more compounds selected from the group of compounds of tables A and B and/or five or more compounds selected from the group of compounds of table B and/or two or more compounds selected from the group of compounds of table A.

EXAMPLES

The examples given in the following are illustrating the present invention without limiting it in any way.

However, the physical data especially of the compounds illustrate to the expert which properties can be achieved in which ranges. Especially the combination of the various properties which can be preferably achieved is thus well defined.

Example 1

Preparation of

E-1-(4-n-pentyl-phenyl)-2-(3-fluoro-4-isothiocyanato-phenyl)-ethene.

Step 1

49.2 g of the amine E-1-(4-n-pentyl-phenyl)-2-(4-amino-3-fluoro-phenyl)-ethene were prepared in house following scheme 11 shown above. Appropriate amounts of 4-pentyl-styrene, triethylamine and 4-bromo-2-fluoroaniline were dissolved in 600 ml of acetonitrile. Then 6.3 g of palladium-II-acetate and 6.8 g of tri-o-tolylphosphine were added. The reaction system was heated under reflux for 72 hours. Then the reaction system was cooled to 0° C. within 2 hours. Subsequently the product and tirethyl amine hydrobromide were filtered off. The solids were washed with acetonitrile and water subsequently. The product was dried (yield 49.2 g) and used as such for the further reaction.

Step 2

The amine was dissolved in 250 ml dichloromethane of Merck KGaA (Art.No. 106 049) and placed in a reaction bulb. 62.0 g of 1,1-thiocarbonyldiimidazole of Biesterfeld (Art.No. ST 736) were dissolved in 350 ml dichloromethane. The 1,1-thiocarbonyldiimidazole solution was added dropwise to the solution of the amine. The speed of addition was adjusted so that the temperature in the vessel did never exceed 35° C. The resultant mixture was stirred for 12 hours. Then water and dichloromethane were added. The organic phase was separated, dried and the solvent removed using a vacuum evaporator. The resultant product was purified over silica gel in toluene. The appropriate fractions were combined and the solvent evaporated, as described above. The product was then subsequently recrystallized twice from heptane at a temperature of 0° C. The final white crystals were filtered off and the residual solvent was evaporated. The yield was 9.0 g of

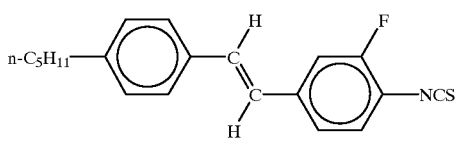

which had a melting point of 74.0° C. and a clearing point of 99.7° C.

Example 2

E-1-(4-ethoxy-phenyl)-2-(3-fluoro-4-isothiocyanato-phenyl)-ethene was prepared by the method described under Example 1 above.

12.0 g of E-1-(4-ethoxy-phenyl)-2-(4-amino-3-fluoro-phenyl)-ethene, made in house, in 150 ml dichloromethane were reacted with 16.752 g 1,1-thiocarbonyldiimidazole in 250 ml dichloromethane. After the second recrystallization from heptane a final yield of 9.0 g of white crystals of

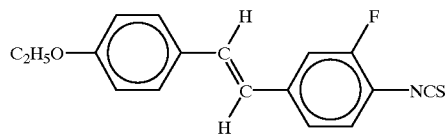

were obtained, which had a melting point of 129.0° C. and a clearing point of 149.0° C.

Example 3

E-1-(4-n-butoxy-phenyl)-2-(3-fluoro-4-isothiocyanato-phenyl)-ethane has been prepared by the method described under Example 1 above. The starting material in this case was 47.1 g of E-1-(4-butoxy-phenyl)-2-(4-amino-3-fluoro-phenyl)-ethene prepared in house. To this 58.812 g of 1,1-thiocarbonyldiimidazole were added. The product was recrystallized from heptane three times after purification over silica gel. The final yield was 9.0 g of white crystalline

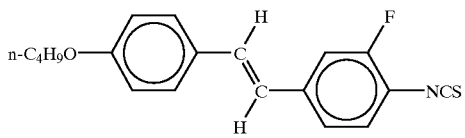

with a melting point of 104.0° C. and a clearing point of 139.8° C.

Example 4

E-1-(4-ethoxy-phenyl)-2-(4-isothiocyanato-phenyl)-ethene was prepared by the method described under Example 1 above.

23.45 g of E-1-(4-ethoxy-phenyl)-2-(4-amino-phenyl)-ethene in 150 ml dichloromethane were reacted with 34.931 g 1,1-thiocarbonyldiimidazole in 250 ml dichloromethane. After the second recrystalization from heptane the final yield was 13.0 g of white crystals of

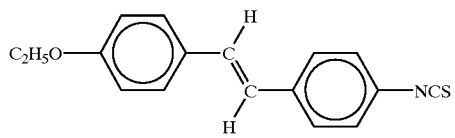

which had a melting point of 174° C. and a clearing point of 176.9° C.

Example 5

E-1-(4-ethoxy-phenyl)-2-(3,5-difluoro-4-isothiocyanato)-ethene was prepared by the method described under Example 1 above.

Step 1

10.0 g of 4-ethoxy-styrene, 18.02 ml triethylamine and 13.52 g of 4-bromo-2,6-difloroaniline were dissolved in 200 ml of acetonitrile. Then 0.292 g of palladium-II-acetate and 0.799 g of tri-o-tolylphosphine were added. The components were heated under reflux for 72 hours. Subsequently the reaction system was cooled to 0° C. within 2 hours. Then it was filtered and washed with acetonitrile and distilled water. The product (yield 17.4 g) was dried and used directly for the further reaction.

Step 2

17.4 g of E-1-(4-ethoxy-phenyl)-2-(4-amino-3,5-difluoro-phenyl)-ethene in 150 ml dichloromethane were reacted with 23.168 g of 1,1-thiocarbonyldiimidazole in 250 ml dichloromethane. The product was recrystallized twice from heptane. The final yield was 11.0 g of white crystals of

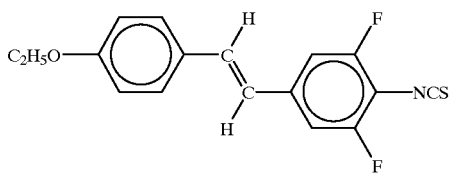

with a melting point of 134° C.

Example 6

E-1-(4-butyloxy-phenyl)-2-(3,5-difluoro-4-isothiocyanato-phenyl)-ethene was prepared by the method described under Example 1 above.

50.0 g of E-1-(4-butyloxy-phenyl)-2-(4-amino-3,5-difluoro-phenyl)-ethene prepared in house in 150 ml dichloromethane were reacted with 58.0 g 1,1-thiocarbonyldiimidazole in 250 ml dichloromethane.

The product was recrystallized twice from heptane. The final yield was 8.0 g of white crystals of

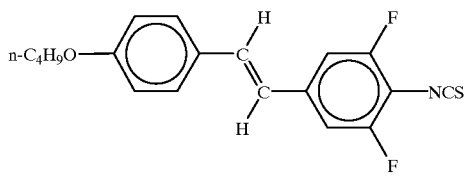

with a melting point of 92° C. and a clearing point of 109.5° C.

Examples 7 to 37

Analogously to Example 1 the following compounds are prepared:

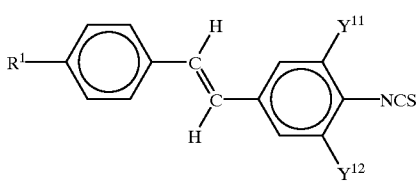

| No. | R¹ | $Y^{11}$ | $Y^{12}$ | Phases (T/° C.) |
|---|---|---|---|---|
| 7 | $C_2H_5$ | H | H | |
| 8 | n-$C_3H_7$ | H | H | |
| 9 | n-$C_4H_9$ | H | H | |
| 10 | n-$C_5H_{11}$ | H | H | C 106 $S_X$ 142 I |
| 11 | $CH_3O$ | H | H | |
| 12 | n-$C_3H_7O$ | H | H | |
| 13 | n-$C_4H_9O$ | H | H | |
| 14 | $CH_2$=CH | H | H | |
| 15 | E-$CH_3$—$CH_2$=CH | H | H | |
| 16 | $CH_2$=CH—O | H | H | |
| 17 | $CH_2$=CH—$CH_2$O | H | H | |
| 18 | $C_2H_5$ | F | H | |
| 19 | n-$C_3H_7$ | F | H | C 95 N (94.5) I |
| 20 | n-$C_4H_9$ | F | H | C 70 N 86.5 I |
| 21 | $CH_3O$ | F | H | |
| 22 | n-$C_3H_7O$ | F | H | C 89 S 113 N 131.9 I |
| 23 | n-$C_5H_{11}O$ | F | H | C 104 N 139.8 I |
| 24 | $CH_2$=CH | F | H | C 117 I |
| 25 | E-$CH_3$—CH=CH | F | H | |
| 26 | $CH_2$=CH—O | F | H | |
| 27 | $CH_2$=CH—$CH_2$O | F | H | |
| 28 | $C_2H_5$ | F | F | |
| 29 | n-$C_3H_7$ | F | F | |
| 30 | n-$C_4H_9$ | F | F | |
| 31 | n-$C_5H_{11}$ | F | F | |
| 32 | $CH_3O$ | F | F | |
| 33 | n-$C_3H_7O$ | F | F | |
| 34 | $CH_2$=CH | F | F | |
| 35 | E-$CH_3$—CH=CH | F | F | |
| 36 | $CH_2$=CH—O | F | F | |
| 37 | $CH_2$=CH—$CH_2$O | F | F | |

Examples 38 to 72

Analogously to Example 1 the following compounds are prepared

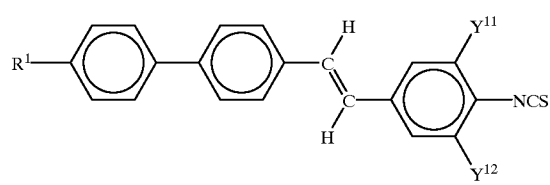

| No. | R¹ | $Y^{11}$ | $Y^{12}$ | Phases (T/° C.) |
|---|---|---|---|---|
| 38 | $C_2H_5$ | F | H | |
| 39 | n-$C_3H_7$ | F | H | C 135 $S_X$ 169 $S_A$ 181 N 248.8 I |
| 40 | n-$C_4H_9$ | F | H | |
| 41 | n-$C_5H_{11}$ | F | H | |
| 42 | $CH_3O$ | F | H | |
| 43 | $C_2H_5O$ | F | H | |
| 44 | n-$C_3H_7O$ | F | H | |
| 45 | n-$C_4H_9O$ | F | H | |
| 46 | $CH_2$=CH | F | H | C 170 dec. |
| 47 | E-$CH_3$—CH=CH | F | H | |
| 48 | $CH_2$=CH—O | F | H | |
| 49 | $CH_2$=CH—$CH_2$O | F | H | |
| 50 | $C_2H_5$ | F | F | C 136 N 263.7 I |
| 51 | n-$C_3H_7$ | F | F | C 124 N 267.3 I |
| 52 | n-$C_4H_9$ | F | F | C 90 N $S_C$ 93 N 246.5 I |
| 53 | n-$C_5H_{11}$ | F | F | |

-continued

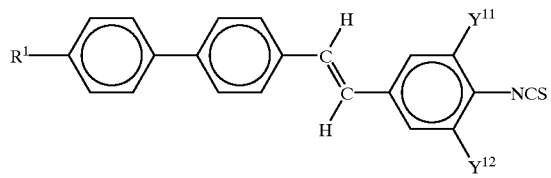

| No. | R¹ | Y¹¹ | Y¹² | Phases (T/° C.) |
|---|---|---|---|---|
| 54 | CH₃O | F | F | |
| 55 | C₂H₅O | F | F | |
| 56 | n-C₃H₇O | F | F | |
| 57 | n-C₄H₉O | F | F | |
| 58 | CH₂=CH | F | F | |
| 59 | E-CH₃—CH=CH | F | F | |
| 60 | CH₂=CH—O | F | F | |
| 61 | CH₂=CH—CH₂O | F | F | |
| 62 | C₂H₅ | H | H | |
| 63 | n-C₃H₇ | H | H | |
| 64 | n-C₄H₉ | H | H | |
| 65 | n-C₅H₁₁ | H | H | |
| 66 | CH₃O | H | H | |
| 67 | C₂H₅O | H | H | |
| 68 | n-C₃H₇O | H | H | |
| 69 | n-C₄H₉O | H | H | |
| 70 | CH₂=CH | H | H | |
| 71 | E-CH₃—CH=CH | H | H | |
| 72 | CH₂=CH—O | H | H | |
| 73 | CH₂=CH—CH₂O | H | H | |

Examples 74 to 109

Analogously to Example 1 the following compounds were prepared

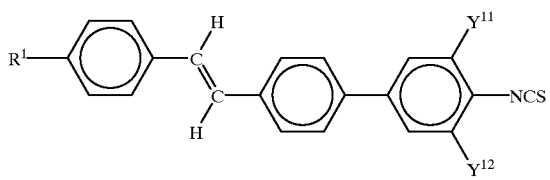

| No. | R¹ | Y¹¹ | Y¹² | Phases (T/° C.) |
|---|---|---|---|---|
| 74 | C₂H₅ | F | H | |
| 75 | n-C₃H₇ | F | H | C 170 S_X 196.5 S_A 209 N 291.4 I |
| 76 | n-C₄H₉ | F | H | |
| 77 | n-C₅H₁₁ | F | H | |
| 78 | CH₃O | F | H | |
| 79 | C₂H₅O | F | H | |
| 80 | n-C₃H₇O | F | H | |
| 81 | n-C₄H₉O | F | H | |
| 82 | CH₂=CH | F | H | |
| 83 | E-CH₃—CH=CH | F | H | |
| 84 | CH₂=CH—O | F | H | |
| 85 | CH₂=CH—CH₂O | F | H | |
| 86 | C₂H₅ | F | F | |
| 87 | n-C₃H₇ | F | F | C 129 N 261.2 I |
| 88 | n-C₄H₉ | F | F | |
| 89 | n-C₅H₁₁ | F | F | |
| 90 | CH₃O | F | F | |
| 91 | C₂H₅O | F | F | |
| 92 | n-C₃H₇O | F | F | |
| 93 | n-C₄H₉O | F | F | |
| 94 | CH₂=CH | F | F | |
| 95 | E-CH₃—CH=CH | F | F | |
| 96 | CH₂=CH—O | F | F | |
| 97 | CH₂=CH—CH₂O | F | F | |

-continued

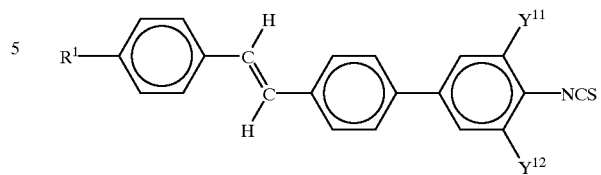

| No. | R¹ | Y¹¹ | Y¹² | Phases (T/° C.) |
|---|---|---|---|---|
| 98 | C₂H₅ | H | H | |
| 99 | n-C₃H₇ | H | H | |
| 100 | n-C₄H₉ | H | H | |
| 101 | n-C₅H₁₁ | H | H | |
| 102 | CH₃O | H | H | |
| 103 | C₂H₅O | H | H | |
| 104 | n-C₃H₇O | H | H | |
| 105 | n-C₄H₉O | H | H | |
| 106 | CH₂=CH | H | H | |
| 107 | E-CH₃—CH=CH | H | H | |
| 108 | CH₂=CH—O | H | H | |
| 109 | CH₂=CH—CH₂O | H | H | |

Example 110

4-isothiocyanato-4"-n-butyl-3'-fluoro-p-terphenyl was prepared as follows.

Step 1

2.106 g of bis(triphenylphosphine) palladium(II)chloride (Merck Schuchart, Art. No. 804 174) were suspended in 20.0 ml tetrahydrofurane (Merck KGaA, Art. No.108 107) in a 50 ml, four necked vessel and heated to 55° C. Now 0.113 g sodiumboric hydride (Merck Schuchart, Art. Nr. 806 372) were added slowly while the suspension was stirred with a magnetic stirrer. The dark mixture was heated under reflux for 30 minutes and then allowed to cool to 40° C. 49.648 g of 1-bromo-3-fluoro-4-iodo-benzene (Wychem, Art. No. 45 570 300/12) 35.60 g of 4-n-butyl-phenylboronic acid, prepared in house), 330 ml toluene (Merck KGaA, Art. No.108 325), 130 ml ethanol (Merck KGaA, Art. No.100 983) and 170 ml of a solution of sodium carbonate (Merck KGaA, Art. No.106 384) were placed in an 1 I, four necked vessel at ambient temperature and heated to 50° C. Now the freshly prepared 40° C. warm solution of the Pd⁰-catalyst was rapidly added dropwise to the vigorously stirred reaction mixture. The brown mixture was stirred at 50° C. for 16 hours. The completeness of the reaction was confirmed by thin sheet chromatography. The reaction mixture was cooled to ambient temperature. Then distilled water and methyl-t-butyl ether were added and the phases separated. The aquous phase was extracted twice with methyl-t-butyl ether. The combined organic phases were washed twice with distilled water, dried over Na₂SO₄ filtered and the solvent evaporated. The crude product of 74 g of 4-bromo-4'-n-butyl-2-fluoro-biphenyl was purified over 3 I silica gel with 1-chloro-butane. The resultant 61.4 g of crude product were distilled under reduced pressure. Thus 45.4 g of 4-bromo-4'-n-butyl-2-fluoro-biphenyl with a purity of 90.6% by GC were obtained.

Step 2

11.0 g of 4-bromo-4'-n-butyl-2-fluoro-biphenyl, prepared as described above, were dissolved in 100 ml diethylether (Merck KGaA, Art. No. 100 929) and cooled to −70° C. At this temperature subsequently 21.963 ml of a 15% solution of n-butyllithium (Merck Schuchart, Art. No. 818 874) was added dropwise, the reaction mixture stirred for 1 hour, 4.022 ml trimethylborate (Merck Schuchart, Art. No. 821 180) added dropwise and the reaction mixture stirred again, now for 30 minutes. The completeness of the reaction was verified by thin sheet chromatography. Then the mixture was allowed to heat up to −10° C. and hydrolyzed with distilled water. Then the pH value was adjusted to 2 by addition of diluted hydrochloric acid prepared equal amounts of concentrated hydrochloric acid (Merck KGaA, Art. No. 314) and of distilled water. The phases were separated. The aqueous phase was extracted twice with methyl-t-butyl ether. The combined organic phases were washed twice with distilled water, dried over $Na_2SO_4$, filtered and the solvent evaporated. The crude product of 12.2 g of 4'-n-butyl-2-fluoro-biphenyl-4-ylboronic acid was purified by recrystallisation from heptane in the ratio of 1/10 at −20° C. and washed with cold heptane.

Step 3

4"-n-butyl-3'-fluoro-p-terphenyl-4-ylamine was prepared.

3.00 g of 4'-n-butyl-2-fluoro-biphenyl-4-ylboronic acid prepared in house, 1.90 g of 4-bromo-aninline (Merck KGaA, Art. No. 801 600), 10 mg of palladium(II) acetate (Merck-Schuchart, Art. No. 818 056) and 35 mg of trisphenylphosphine (Merck-Schuchart, Art. No. 808 270) were placed together with 30.0 ml of 2-propanol in a four necked 100 ml vessel and heated for 16 hours under reflux (i.e. at 82° C.). The completeness of the reaction was confirmed by thin sheet chromatography. Then the reaction vessel was taken out of the hot bath and 4.0 ml distilled water were added to the hot, darkish reaction mixture. At a temperature of the mixture of approximately 40° C. methyl-t-butyl ether was added and the phases separated. The organic phase was washed once each with 5% aqueous solution of $NaHCO_3$ and saturated aqueous solution of NaCl. The aqueous phases were combined and extracted with methyl-t-butyl ether. The organic phases were combined and dried over $Na_2SO_4$. Then the solution was filtered and the solvent evaporated. The yield was 2.50 of slightly brown crystals.

Step 4

The 2.50 g of 4"-n-butyl-3'-fluoro-p-terphenyl-4-ylamine thus prepared and 2.80 g of 1,1-thiocarbonyldiimidazole were dissolved in 250 ml dichloromethane. The solution was stirred for 16 hours at ambient temperature of approximately 22° C. The completeness of the reaction was verified by thin sheet chromatography with 1-chloro-butane. Evaporation of the solvent yielded 5.4 g of crude product. This was purified over silica gel in 1-chloro-butane and subsequently recrystallized at 5° C. from n-heptane. The final yield was 2.0 g of white crystals of 4-isothiocyanato-4"-n-butyl-3'-fluoro-p-terphenyl with a purity of 99.6% by GC.

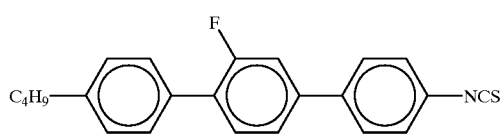

The phase sequence was as follows:

C 116° C. $S_A$ 138° C. N 200.1° C. I.

Examples 111 to 121

Analogously to Example 110 the following compounds are prepared $R^1$—⟨⟩—⟨F⟩—⟨⟩—NCS

| No. | $R^1$ | Phases (T/° C.) |
|---|---|---|
| 111 | $C_2H_5$ | |
| 112 | n-$C_3H_7$ | |
| 113 | n-$C_5H_{11}$ | |
| 114 | $CH_3O$ | |
| 115 | $C_2H_5O$ | |
| 116 | n-$C_3H_7O$ | |
| 117 | n-$C_4H_9O$ | |
| 118 | $CH_2$=CH | |
| 119 | E-$CH_3$—CH=CH | |
| 120 | $CH_2$=CH—O | |
| 121 | $CH_2$=CH—$CH_2O$ | |

Example 122

4"-n-butyl-2", 6"-difluoro-1-isothiocyanato-p-terphenyl was prepared as follows.

Step 1

150 g biphenyl (Merck-Schuchart, Art. No. 803 090) and 75.0 iodine (Merck KGaA, Art. No. 104 760) were added and heated to about 70° C. Then 360 ml nitric acid (65%, Merck KGaA, Art. No. 100 456) were added dropwise, which lead to strong formation of gas. Then 20 ml dichloromethane (Merck KGaA, Art. No. 106 050) were added and the mixture heated at approximately 75° C. under reflux for 1 hour. Now distilled water was added to the reaction mixture until a yellow solid precipitated. The liquid was poured off from the precipitate. The precipitate was washed five times with 500 ml each of distilled water. Each time the water was poured off from the precipitate. Then the precipitate was suspended in 500 ml toluene filtered off and washed with 250 ml of toluene. The yield was 102.3 g of 4-iodo-4'-nitro-biphenyl with a purity of 94.9% (by HPLC).

Step 2

350 g of tin(II)chloride dihydrate were dissolved in 500 ml fuming hydrochloric acid (both Merck KGaA, Art. Nos. 107 813 and 100 314, respectively). During this process the temperature decreased to 15° C. Then the clear solution was heated to approximately 50° C. and 92 g of 4-iodo-4' nitro-biphenyl, prepared as described above, were added. The yellow suspension was stirred at 60° C. for 16 hours. The completeness of the reaction was confirmed by thin layer chromatography with toluene as solvent. The reaction mixture was cooled down and poured into distilled water with ice. A surplus of 1.300 l of aquous sodium hydroxide was added, leading to an exothermic reaction. The reaction mixture was extracted with 3 l of toluene. The phases were separated and the organic phase washed two times with 1 l each of distilled water. The combined aquous phases were extracted with 1 l of toluene. Then the organic phases were combined, dried over $Na_2SO_4$, filtered and the solvent evaporated. The yield was 83.2 g of 4'-iodo-biphenyl-4-ylamine with a purity of 92.1% by GC.

Step 3

74.954 g zinc chloride (Merck KGaA, Art. No. 108 815) were dissolved in 700 ml tetrahydrofurane. Then 671.105 ml of a solution of n-butyllithium (Merck Schuchart, Art. No. 818 874) were added dropwise without cooling. The temperature of the clear solution gradually increased to 50° C. during the addition. The instantly blue solution became a white suspension. Then the reaction mixture was stirred for 30 minutes without cooling. Next 3.659 g 1,1'-bis (diphenylphosphino)-ferrocene-palladium(II)dichloride (short PdCl$_2$-dppf), prepared in house, were added. Now the color of the mixture turned to beige. Then 115.15 ml 1-bromo-3,5-difluoro-benzene, prepared in house, dissolved in 300 ml tetrahydrofurane were added dropwise to the boiling reaction mixture. The temperature was 62° C. The color of the solution became dark brown and a precipitate formed. The reaction mixture was heated under reflux for 2 hours and then cooled down. Then distilled water was added and acidified with diluted hydrochloric acid. The reaction mixture was extracted twice with hexane. The combined organic phases were washed with distilled water, dried over Na$_2$SO$_4$ and the solvent evaporated carefully. The yield was 260 g of crude product still including some solvent. The crude product was distilled under reduced pressure. The yield was 155 g of a clear liquid consisting of 1-n-butyl-3, 5-difluoro-benzene with a purity of 98.8% by GC.

Step 4

155.0 g 1-n-butyl-3,5-difluoro-benzene, prepared as described above, were dissolved in 2.01 of tetrahydrofurane (Merck KGaA, Art. No.108 107) in a reaction vessel and cooled to –70° C. At –70° C. 610.095 ml of a solution of n-butyllithium (Merck KGaA, Art. No. 818 874) was added dropwise. Then the reaction mixture was stirred for 30 minutes at –70° C. Next 11.731 ml of trimethylborate were added at –70° C. and the reaction mixture stirred for 30 minutes at this temperature. The completeness of the reaction was confirmed by thin layer chromatography. Then the reaction mixture was allowed to heat up to –20° C. and was hydrolyzed with distilled water. By the addition of diluted hydrochloric acid prepared from equal amounts of concentrated hydrochloric acid (Merck KGaA, Art. No. 314) and of distilled water, the pH value was adjusted to 2. The organic phase was separated and the aquous phase extracted twice with methyl-t-butyl ether. The combined organic phases were washed twice with distilled water and once with saturated solution of NaCl, dried over Na$_2$SO$_4$ filtered and the solvent evaporated. The yield was 197.1 g of the crude product 4-n-butyl-2,6-difluoro-phenylboronic acid.

Step 5

15.0 g of 4-n-butyl-2,6-difluoro-phenylboronic acid and 25,0 g of 4'-iodo-biphenyl-4-ylamine, both prepared in house as described above, were dissolved in 200.0 ml tetrahydrofurane (Merck KGaA, Art. No. 108 107). A buffer solution of 9.6 g potassium dihydogenphosphate and 50.2 g disodium hydrogenphosphate in 100 ml distilled water was added under stirring. The reaction mixture was heated rapidly to the boiling point by immersion into a preheated hot bath. At a temperature of approximately 60° C. 1.20 g tetrakis(triphenylphosphine) palladium (0) was added and the reaction mixture heated under reflux for 65 hours. The completeness of the reaction was checked by thin layer chromatography. The reaction mixture was cooled and then distilled water and methyl-t-butyl ether were added. The phases were separated and the organic phase washed twice with distilled water. The aquous phases were combined and washed twice with methyl-t-butyl ether. The organic phases were combined and dried over Na$_2$SO$_4$. Then the solution was filtered and the solvent evaporated. The 35 g of raw product thus obtained were recrystallized from n-hexane. 11.2 g of first crystals were obtained.

Step 6

These 11.2 g of 4" n-butyl-2", 6"-difluoro-terphenyl-4-ylamine were dissolved together with 12.5 g of 1,1-thiocarbonyldiimidazole in 100 ml dichloromethane and stirred for 16 hours at ambient temperature of about 22° C. The completeness of the reaction was verified by thin sheet chromatography. The solvent was evaporated and the product purified over silica gel in 1-chlorobutane. After several purification steps the product was obtained with a purity of 99.8% bay GC.

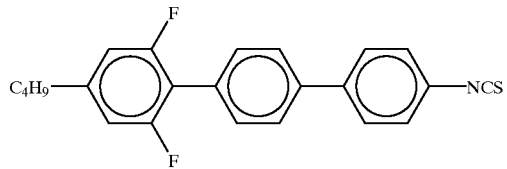

It had the following phase sequence:
C 132° C. S$_A$ 138° C. N 176.6° C. I.

Examples 123 to 146

Analogously to Example 110 the following compounds are prepared

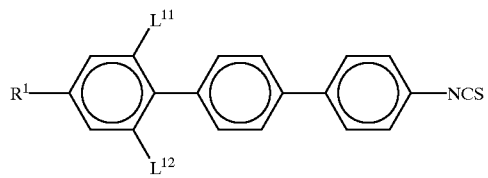

| No. | R$^1$ | L$^{11}$ | L$^{12}$ | Phases (T/° C.) |
|---|---|---|---|---|
| 123 | C$_2$H$_5$ | F | H | |
| 124 | n-C$_3$H$_7$ | F | H | |
| 125 | n-C$_4$H$_9$ | F | H | |
| 126 | n-C$_5$H$_{11}$ | F | H | |
| 127 | CH$_3$O | F | H | |
| 128 | C$_2$H$_5$O | F | H | |
| 129 | n-C$_3$H$_7$O | F | H | |
| 130 | n-C$_4$H$_9$O | F | H | |
| 131 | CH$_2$=CH | F | H | |
| 132 | E-CH$_3$—CH=CH | F | H | |
| 133 | CH$_2$=CH—O | F | H | |
| 134 | CH$_2$=CH—CH$_2$O | F | H | |
| 135 | C$_2$H$_5$ | F | F | |
| 136 | n-C$_3$H$_7$ | F | F | |
| 137 | n-C$_4$H$_9$ | F | F | |
| 138 | n-C$_5$H$_{11}$ | F | F | |
| 139 | CH$_3$O | F | F | |
| 140 | C$_2$H$_5$O | F | F | |
| 141 | n-C$_3$H$_7$O | F | F | |
| 142 | n-C$_4$H$_9$O | F | F | |
| 143 | CH$_2$=CH | F | F | |
| 144 | E-CH$_3$—CH=CH | F | F | |
| 145 | CH$_2$=CH—O | F | F | |
| 146 | CH$_2$=CH—CH$_2$O | F | F | |

Example 147

4"-trifluoromethoxy-3,5-difluoro-1-isothiocyanato-p-terphenyl was prepared.

Step 1

73 ml p-trifluoromethoxy-phenylbromide and 60 g phenylboronic acid were dissolved in 500 ml of ethanol and 1 l of toluene, 500 ml distilled water with 103 g Na$_2$CO$_3$ and 5 g tetrakis(triphenylphosphine) palladium (0) were added. The mixture was heated under reflux for 16 hours. After the reaction was complete the mixture was cooled to ambient temperature and filtered over diatom earth (kieselguhr). The organic phase was separated and washed two times with 200 ml each of distilled water. The combined aquous phases were extracted with toluene. The organic phases were combined and the solvent was evaporated. The residue was dissolved in hexane and purified over silica gel. The yield was 70 g of 4-trifluoromethoxy-biphenyl.

Step 2

100 g 4-trifluoromethoxy-biphenyl, prepared as described above, were dissolved in 500 l glacial acetic acid and 3 g powderized iron added. At ambient temperature 23 ml bromine ($Br_2$ (I)) were added dropwise. The mixture was stirred for 16 hours at ambient temperature. To complete the reaction the mixture was heated to 40° C. and stirred for 24 hours. Then further 8 ml bromine were added and the mixture was stirred at 60° C. for 20 hours. The reaction mixture was cooled down and poured into distilled water with ice. The precipitated crystals were filtered off and washed with distilled water. The product, 4-bromo-4'-trifluoromethoxy-biphenyl, was recrystallized from approximately 400 ml of ethanol. The yield was 73 g, still including some ethanol. After 65 hours in a desiccator the yield was 69.5 g.

Step 3

4-bromo-4'-trifluoromethoxy-biphenyl was converted into 4'-trifluoromethoxy-biphenyl-4-ylboronic acid in the conventional way.

Step 4

10.0 g of 4'-trifluoromethoxy-biphenyl-4-ylboronic acid and 7.3 g of 4-bromo-2,6-difluoroaniline were added together with 5.8 g solid NaOH and 1.0 g tetrakis (triphenylphosphine) palladium (0) to 75 ml toluene and 35 ml distilled water. The reaction mixture was vigorously stirred and heated under reflux for 3 hours. Then the product, 3,5-difluoro-4"-trifluoromethoxy-terphenyl-4-ylamine, was purified by recrystallization from hexane. The yield was 6.0 g of white crystals.

Step 5

5.8 g of 1,1-thiocarbonyldiimidazole were dissolved in 100 ml dichloromethane and cooled to 10° C. Then the 6.0 g of 3,5-difluoro-4"-trifluoromethoxy-terphenyl-4-ylamine, prepared as described above, were added and the mixture stirred for 24 hours at ambient temperature of about 22° C. In this process the terphenyl compound successively dissolved. The solvent of the reaction mixture was evaporated and the residue purified in toluene/hexane (1/9) over silica gel filled into a frit. The appropriate fractions were combined. The solvent was evaporated and the residue was recrystallized from n-hexane. The yield was 1.8 g of white crystals with a content (by GC) of 99.6% of

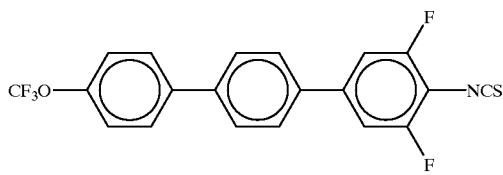

with a melting point of 77° C. and a clearing point 190.8° C.

Example 148

4-isothiocyanato-4"-chloro-3,5-difluoro-p-terphenyl was prepared.

Step 1

Phenylboronic acid was coupled with p-chlorophenylbromide to 4-chloro-biphenyl and the product purified the usual way. The coupling agent was prepared from palladiumchloride and triphenylphosphine.

Step 2

The 4-chloro-biphenyl was brominated analoguously to step 2 of example 147 to 4-bromo-4'-chloro-biphenyl.

Step 3

239 g t-butyllithium (15% solution, Merck KGaA, Art. No. 818 874) and 58 g trimethylborate (Merck KGaA, Art. No. 821 180) were dissolved in 800 ml tetrahydrofurane and placed in a 4-1 vessel under nitrogen atmosphere. The mixture was cooled to −70° C. Then 139.3 g of 4-bromo-4'-chloro-biphenyl (content 97.4%) dissolved in 500 ml tetrahydrofurane were added dropwise over a period of 20 minutes. The resultant suspension was stirred for 2 hours at −70° C. Then the cold bath was removed and the temperature allowed to rise to −20° C. Next diluted hydrochloric acid prepared from 80 ml of concentrated hydrochloric acid (Merck KGaA, Art. No. 314) and 80 ml of distilled water, were added dropwise within 30 minutes. Within this time the temperature of the reaction mixture rose to +5° C. Then 500 ml distilled water were added. Subsequently 400 ml of methyl-t-butyl ether were added and the mixture stirred. Then the phases were separated. The aquous phase was extracted with 300 ml of methyl-t-butyl ether. The combined organic phases were dried over 250 g $Na_2SO_4$ (Merck KGaA, Art. No. 6 645). Then the solvent was evaporated. The resultant 129 g of crude product were stirred 1 hour in 700 ml n-hexane (Merck KGaA, Art. No. 4 368), filtered off, washed with n-hexane and finally dried under vacuum at ambient temperature. The yield was 107.1 g of 4'-chloro-biphenyl-4-ylboronic acid.

Step 4

4'-chloro-biphenyl-4-ylboronic acid was coupled with 4-bromo-2,6-difluoroaniline analoguously to step 4 of example 147. As solvent a mixture of 320 ml toluene (Merck KGaA, Art. No. 8 3232) and 160 ml ethanol (Merck KGaA, Art. No. 986) was used. 380 ml of this solvent mixture were placed in the reaction vessel under nitrogen atmosphere. At 50° C. 51.1 g 4'-chloro-biphenyl-4-ylboronic acid were dissolved by stirring the solvent mixture. Then first a solution of 136.8 g $Na_2CO_3 10H_2O$ (Merck KGaA, Art. No. 6 384) in 135 ml distilled water and 2.4 g of tetrakis (triphenylphosphonium) palladium (0) (Merck KGaA, Art. No. 818 193) was added. Then, the mixture was heated to 65° C. Now 41.6 g of 4-bromo-2,6-difluoro-aniline dissolved in 100 ml of the solvent mixture (toluene/ethanol= 2/1) were added dropwise within 20 minutes. Now the reaction mixture was slightly boiling at a temperature of about 75° C. After heating for 3 hours under reflux 300 ml of distilled water were added. At a temperature of 60° C. the phases started to separate. The organic phase was filtered over diotaom earth (Kieselguhr, Merck KGaA, Art. No. 8 117) and washed twice with 300 ml distilled water each and then dried over 200 g $Na_2SO_4$ (Merck KGaA, Art. No. 6 645). Next the solvent was evaporated. 61 g of crude product were obtained. The crude product was dissolved in a mixture of 1.5 l of toluene and 150 ml of ethylacetate (Merck KGaA, Art. No. 864) and purified over a column with a diameter of 9 cm, filled with 200 g Al₂O₃ and 400 g silica gel (Merck KGaA, Art. Nos. 1077 and 7 734, respectively). The product was eluted with 1.5 l of toluene. The respective fractions were combined and the solvent evaporated. The product was recrystallized from 220 ml of ethylacetate. The yield was 45.6 g of 4"-chloro-3,6-difluoro-p-terphenyl-4-ylamine with a purity of 94.9% by GC.

Step 5

33.3 g of this 4"-chloro-3,6-difluoro-p-terphenyl-4-ylamine were dissolved at 35° C. in 1.0 l dichloromethane (Merck KGaA, Art. No. 6 049) under stirring under nitrogen atmosphere. Then 49.5 g 1,1'-thiocarbonyldiimidazole (Aldrich, content 90%, Art. No.15,605-1) were added. The mixture was stirred for 65 hours at a temperature of 40° C. Then, it was cooled down to ambient temperature and washed twice, each time with with 250 ml of distilled water. The solvent of the organic phase was evaporated and 79 g of a yellow oil were obtained. This crude product was dissolved in 1.0 l of toluene. The resultant opaque solution was put on a column with a diameter of 10 cm, filled with 500 g of Al₂O₃ and 800 g of silica gel (Merck KGaA, Art. Nos. 1077 and 7 734, respectively). The product was eluted with 4.0 l of toluene. The respective colorless fractions were combined and the solvent evaporated. The product (20 g) was recrystallized once from 200 ml of ethylacetate and twice, each time from 50 ml of toluene. The final yield was 14.8 g of 4-isothiocyanato-4"-chloro-3,6-difluoro-p-terphenyl with a purity of 99.6% by GC.

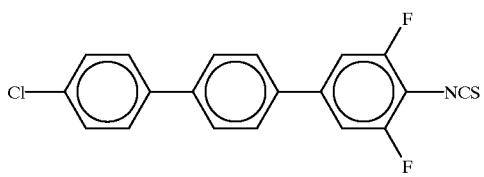

It had a melting point of 129° C. and a clearing point of 246.1° C. Examples 149 to 167

Analogously to Example 147 the following compounds are prepared

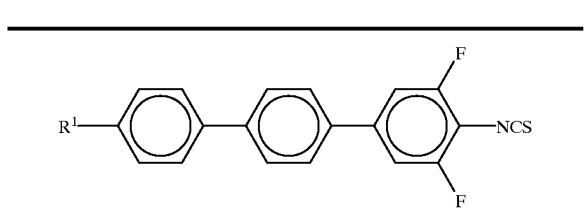

| No. | R¹ | L¹¹ | L¹² | Phases (T/° C.) |
|---|---|---|---|---|
| 149 | F | H | H | |
| 150 | Cl | H | H | |
| 151 | CF₂H | H | H | |
| 152 | CF₃ | H | H | |
| 153 | OCF₂H | H | H | |
| 154 | OCF₃ | H | H | |
| 155 | OCF₂CF₃ | H | H | |
| 156 | F | F | H | |
| 157 | Cl | F | H | |
| 158 | CF₂H | F | H | |
| 159 | CF₃ | F | H | |
| 160 | OCF₂H | F | H | |
| 161 | OCF₃ | F | H | |
| 162 | OCF₂CF₃ | F | H | |
| 163 | F | F | F | |

-continued

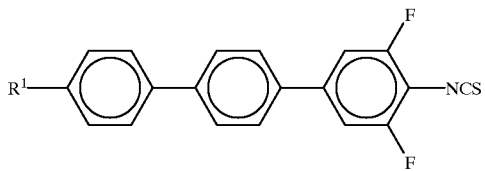

| No. | R¹ | L¹¹ | L¹² | Phases (T/° C.) |
|---|---|---|---|---|
| 164 | CF₂H | F | F | |
| 165 | CF₃ | F | F | |
| 166 | OCF₂H | F | F | |
| 167 | OCF₂CF₃ | F | F | |

Example 168

4'-n-propyl-3,5-difluoro-4-isothiocyanato-biphenyl was prepared.

Step 1

500 g p-n-propyl-phenylbromide, prepared in house, was dissolved by stirring in 3.50 l of dried tetrahydrofurane (Merck KGaA, Art. No.108 107) and cooled down to −70° C. Then 1608.6 ml of n-butyllithium (15% solution, Merck KGaA, Art. No. 818 874) was added dropwise at this temperature. Subsequently the mixture was stirred for 1 hour at −70° C. Next 294.6 g of trimethylborate (Merck KGaA, Art. No. 821 180) was added dropwise at −70° C. and the mixture stirred subsequently for 30 minutes. Then the reaction mixture was allowed to heat up to −30° C. by removal of the cooling bath and then 1 l of distilled water was added rapidly. The reaction mixture was acidified with 2n-hydrochloric acid and extracted with methyl-t-butyl-ether. The organic phase was washed twice with distilled water, dried and it's solvent evaporated. The product was p-n-propylphenyl boronic acid. The yield was 264 g after recrystallization from n-hexane.

Step 2

348 g trisodiumphosphate dodecahydrate (Merck KGaA, Art. No.106 578) were dissolved in 500 ml of distilled water. Then 8.563 g bis(triphenylphosphine) palladium (Merck KGaA, Art. No. 804 174) and 0.611 g hydaziniumhydroxide (Merck KGaA, Art. No. 804 604) were added. The suspension was stirred for 5 minutes. Then, 126.886 g 4-bromo-2,6-difluoro-aniline, prepared in house, were added. Next 100 g of the p-n-propylphenyl boronic acid, prepared as described above, dissolved in 600 ml dried tetrahydrafurane (Merck KGaA, Art. No.108 107) was added dropwise. The reaction mixture was heated 6 hours under reflux. The organic layer was separated, dried over Na₂SO₄ and it's solvent evaporated. The isolated crude product (150 g of 4'-n-propyl-3,5-difluoro-biphenyl-4-ylamine was used for the next step of the reaction without further purificatoin.

Step 3

32.0 g of the thus prepared 4'-n-propyl-3,5-difluoro-biphenyl-4-ylamine were dissolved in 150 ml dichloromethane (Merck-Schuchart, Art. No.106 049) at ambient temperature. Then 42.416 g 1,1-thiocarbonyldiimidazole (Biesterfeld, Art. No. ST 736) in 250 ml dichloromethane were added dropwise in such a way that the temperature did not exceed 35° C. The reaction mixture was stirred at ambient temperature for 16 hours. Then distilled water and dichloromethane were added. The organic phase was separated dried and it's solvent evaporated. Subsequently the product was purified over silica gel with toluene as eluent. The appropriate fractions were combined and the solvent evaporated. The product n-propyl-3,5-difluoro-4-isothiocyanato-biphenyl was recrystallized three times from heptane at 0° C. The purity of the final product was 99.5% by GC.

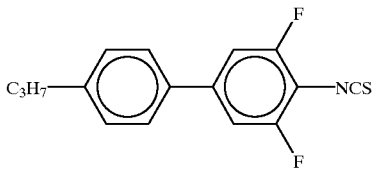

The substance had a melting point of 38° C. and an extrapolated clearing point dissolved by 15% in the nematic mixture ZLI-4792 (Merck KGaA) of −11.2° C.

Example 169

4'-Ethoxy-3,5-difluoro-1-isothiocyanato-biphenyl was prepared.

Step 1

24.4 g magnesium and one piece of iodine in 100 ml tetrahydrofurane were heated under reflux. 202 g p-ethoxyphenylbromide was dissolved in 200 ml tetrahydrofurane. A small portion of this solution was added to the reaction vessel and the exothermal reaction started. Then the heating facility was removed and the the solution was added dropwise and steadily in a way that the reaction mixture was kept boiling all the time. After the addition was finished the mixture was heated for 1 hour under reflux. Then 200 ml tetrahydrofurane were added for dilution and the mixture cooled down. At a temperature in the range from 0 to 15° C. 123 ml trimethylborate in 200 ml tetrahydrofurane were added dropwise. The resultant reaction mixture was a greyish viscous liquid. It was stirred for 1 hour at ambient temperature. Then it was acidified by dropwise addition of 300 ml of hydrochloric acid with a concentration of 18% and diluted with 500 ml distilled water. The organic phase was separated and the aqueous phase extracted twice with ethylacetate. The ethylacetate extracts and the separated organic phase were combined washed three times with distilled water, dried and the solvent evaporated. The crude product (180 g) was recrystalized from toluene at 5° C., washed with cold toluene and dried. The yield was 118.9 g of p-ethoxyphenylboronic acid.

Step 2

Analogously to step 2 of example 168 p-ethoxyphenylboronic acid was coupled with 4-bromo-2,6-difluoro-aniline to 4'-ethoxy-3,5-biphenyl-4-ylamine.

Step 3

55.8 g imidazole were dissolved in 350 ml dichloromethane and cooled to 5° C. Then 14.9 g thiophosgene were added dropwise within 1 hour. The mixture became yellow immediately. The temperature was kept in the range from 5 to 15° C. during the addition. Then the mixture was stirred for 1 hour at 5° C. Then 37.8 g of 4'-ethoxy-3,5-biphenyl-4-ylamine were added by means of a screw converyer. No temperature change was observed. Then the cooling device was removed and the reaction mixture stirred 48 hours at ambient temperature of approximately 22° C. Then the solvent was evaporated and the crude product purified over silica gel (Merck KGaA, Art. No. 7 729). The eluent used was varied from heptane to a mixture toluene/heptane with the ratio 1/1. The corresponding fractions were combined, the solvent evaporated and the residue recrystalized from ethanol. The final yield was 20.5 g of 4'-ethoxy-3,5-difluoro-1-isothiocyanato-biphenyl with a purity of 99.8%.

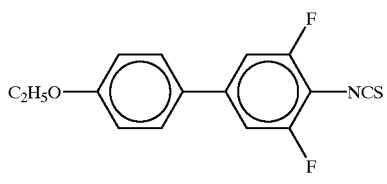

The melting point of the substance was 103° C. and the extrapolated clearing point of the compound dissolved by 15% in the nematic mixture ZLI-4792 (Merck KGaA) was 42° C.

Examples 170 to 191

Analogously to Example 168 the following compounds are prepared

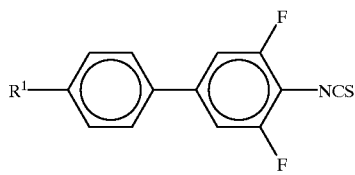

| No. | $R^1$ | $L^{11}$ | $L^{12}$ | Phases (T/° C.) |
|---|---|---|---|---|
| 170 | $C_2H_5$ | F | H | |
| 171 | n-$C_3H_7$ | F | H | |
| 172 | n-$C_4H_9$ | F | H | |
| 173 | n-$C_5H_{11}$ | F | H | |
| 174 | $CH_3O$ | F | H | |
| 175 | $C_2H_5O$ | F | H | |
| 176 | n-$C_3H_7O$ | F | H | |
| 177 | n-$C_4H_9O$ | F | H | |
| 178 | $CH_2$=CH | F | H | |
| 179 | E-$CH_3$—CH=CH | F | H | |
| 180 | $CH_2$=CH—O | F | H | |
| 181 | $CH_2$=CH—$CH_2$O | F | H | |
| 182 | $C_2H_5$ | F | F | |
| 183 | n-$C_4H_9$ | F | F | |
| 184 | n-$C_5H_{11}$ | F | F | |
| 185 | $CH_3O$ | F | F | |
| 186 | n-$C_3H_7O$ | F | F | |
| 187 | n-$C_4H_9O$ | F | F | |
| 188 | $CH_2$=CH | F | F | |
| 189 | E-$CH_3$—CH=CH | F | F | |
| 190 | $CH_2$=CH—O | F | F | |
| 191 | $CH_2$=CH—$CH_2$O | F | F | |

Example 192

E-1-(4-cyano-phenyl)-2-(4-isothiocyanato-phenyl)-ethene was prepared analogously to the compound of example 1 above.

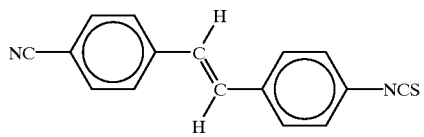

It had the phase sequence: C 188° C. N 190.7° C. I.

Example 193

E-1-(4-cyano-phenyl)-2-(3-fluoro-4-isothiocyanato-phenyl)-ethene was prepared analogously to the compound of example 1 above.

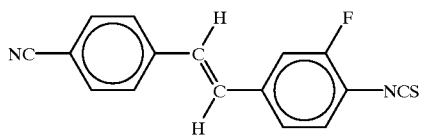

It had the phase sequence: C 178° C. N 181.5° C. I.

Example 194

E-1-(4-cyano-phenyl)-2-(3,5-difluoro4-isothiocyanato-phenyl)-ethene was prepared analogously to the compound of example 1 above.

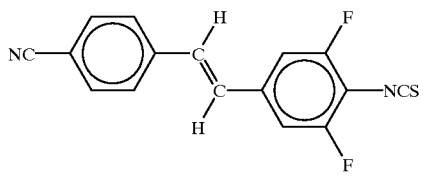

The compound had the phase sequence: C 169° C. I.

Examples 195 to 230

Analogously to Example 110 the following compounds are prepared

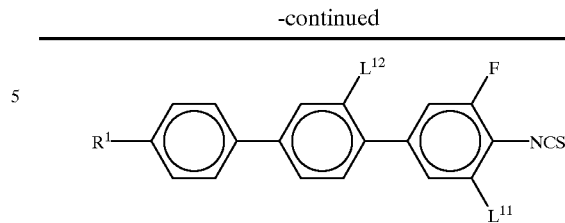

| No. | $R^1$ | $L^{11}$ | $L^{12}$ | Phases (T/° C.) |
|---|---|---|---|---|
| 195 | $C_2H_5$ | H | H | |
| 196 | $n-C_3H_7$ | H | H | |
| 197 | $n-C_4H_9$ | H | H | |
| 198 | $n-C_5H_{11}$ | H | H | |
| 199 | $CH_3O$ | H | H | |
| 200 | $C_2H_5O$ | H | H | |
| 201 | $n-C_3H_7O$ | H | H | |
| 202 | $n-C_4H_9O$ | H | H | |
| 203 | $CH_2=CH$ | H | H | |
| 204 | $E-CH_3-CH=CH$ | H | H | |
| 205 | $CH_2=CH-O$ | H | H | |
| 206 | $CH_2=CH-CH_2O$ | H | H | |
| 207 | $C_2H_5$ | F | H | |

-continued

| No. | $R^1$ | $L^{11}$ | $L^{12}$ | Phases (T/° C.) |
|---|---|---|---|---|
| 208 | $n-C_3H_7$ | F | H | C 107 N 201.4 I |
| 209 | $n-C_4H_9$ | F | H | C 97 $S_A$ 105 N 187.4 I |
| 210 | $n-C_5H_{11}$ | F | H | C 95 $S_A$ 110 N 190.6 I |
| 211 | $CH_3O$ | F | H | |
| 212 | $C_2H_5O$ | F | H | |
| 213 | $n-C_3H_7O$ | F | H | |
| 214 | $n-C_4H_9O$ | F | H | |
| 215 | $CH_2=CH$ | F | H | |
| 216 | $E-CH_3-CH=CH$ | F | H | |
| 217 | $CH_2=CH-O$ | F | H | |
| 218 | $CH_2=CH-CH_2O$ | F | H | |
| 219 | $C_2H_5$ | F | F | |
| 220 | $n-C_3H_7$ | F | F | C 80 N 172.4 I |
| 221 | $n-C_4H_9$ | F | F | |
| 222 | $n-C_5H_{11}$ | F | F | |
| 223 | $CH_3O$ | F | F | |
| 224 | $C_2H_5O$ | F | F | |
| 225 | $n-C_3H_7O$ | F | F | |
| 226 | $n-C_4H_9O$ | F | F | |
| 227 | $CH_2=CH$ | F | F | |
| 228 | $E-CH_3-CH=CH$ | F | F | |
| 229 | $CH_2=CH-O$ | F | F | |
| 230 | $CH_2=CH-CH_2O$ | F | F | |

Example 231

Analogously to example 1 above the compound

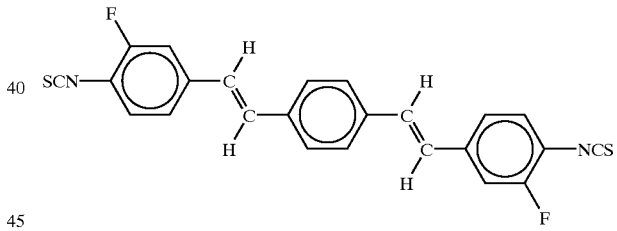

has been prepared. The compound had the phase sequence: C 224° N 270° C. dec.

Use-example 1

A liquid crystal mixture is realized consisting of:

| Compound/Abbreviation | Concentration/mass-% |
|---|---|
| K6 | 12.0 |
| K9 | 4.0 |
| K15 | 29.2 |
| M9 | 8.8 |
| T15 | 8.0 |
| PGIP-3-N | 20.0 |
| PVG-2O-S | 6.0 |
| PVG-4O-S | 6.0 |
| UPP-4-S | 6.0 |
| Σ | 100.0 |

This mixture has the following properties:

| | |
|---|---|
| Clearing point (T(N,I))/° C.: | 95.0 |
| Smectic to nematic transition point (T(S,N))/° C.: | <0 |
| $n_e$ (20° C., 589.3 nm): | 1.8492 |
| $\Delta n$ (20° C., 589.3 nm): | 0.3123 |
| $\epsilon_\parallel$ (20° C., 1 kHz): | 22.5 |
| $\Delta\epsilon$ (20° C., 1 kHz): | 17.3 |
| $k_1$ (20° C.)/pN: | 13.1 |
| $k_3/k_1$ (20° C.): | 1.79 |
| $V_{Freedericksz} = V_O$ (20° C.)/V: | 0.92 |

Use-example 2

A liquid crystal mixture is realized consisting of:

| Compound/Abbreviation | Concentration/mass-% |
|---|---|
| K6 | 7.0 |
| K9 | 4.0 |
| K15 | 29.0 |
| M9 | 8.0 |
| T15 | 8.0 |
| PGIP-3-N | 20.0 |
| PVG-2O-S | 8.0 |
| PVG-4O-S | 8.0 |
| UPP-4-S | 8.0 |
| Σ | 100.0 |

This mixture has the following properties:

| | |
|---|---|
| Clearing point (T(N,I))/° C.: | 102.0 |
| Smectic to nematic transition point (T(S,N))/° C.: | <0 |
| $n_e$ (20° C., 589.3 nm): | 1.8639 |
| $\Delta n$ (20° C., 589.3 nm): | 0.3267 |
| $\epsilon_\parallel$ (20° C., 1 kHz): | 22.6 |
| $\Delta\epsilon$ (20° C., 1 kHz): | 17.4 |
| $k_1$ (20° C.)/pN: | 14.0 |
| $k_3/k_1$ (20° C.): | 1.83 |
| $V_{Freedericksz} \, V_O$ (20° C.)/V: | 0.95 |

Use-example 3

A liquid crystal mixture is realized consisting of:

| Compound/Abbreviation | Concentration/mass-% |
|---|---|
| K6 | 5.0 |
| K9 | 4.0 |
| K15 | 25.0 |
| M9 | 8.0 |
| T15 | 8.0 |
| PGIP-3-N | 20.0 |
| PVG-2O-S | 10.0 |
| PVG-4O-S | 10.0 |
| UPP-4-S | 10.0 |
| Σ | 100.0 |

This mixture has the following properties:

| | |
|---|---|
| Clearing point (T(N,I))/° C.: | 108.0 |
| Smectic to nematic transition point (T(S,N))/° C.: | <0 |
| $n_e$ (20° C., 589.3 nm): | 1.8800 |
| $\Delta n$ (20° C., 589.3 nm): | 0.3425 |
| $\epsilon_\parallel$ (20° C., 1 kHz): | 22.9 |
| $\Delta\epsilon$ (20° C., 1 kHz): | 17.8 |
| $k_1$ (20° C.)/pN: | 15.0 |
| $k_3/k_1$ (20° C.): | 1.76 |
| $V_{Freedericksz} = V_O$ (20° C.)/V: | 0.97 |

Use-example 4

A liquid crystal mixture is realized consisting of:

| Compound/Abbreviation | Concentration/mass-% |
|---|---|
| K9 | 3.0 |
| K15 | 25.0 |
| M9 | 8.0 |
| T15 | 8.0 |
| PGIP-3-N | 20.0 |
| PVG-2O-S | 12.0 |
| PVG-4O-S | 12.0 |
| UPP-4-S | 12.0 |
| Σ | 100.0 |

This mixture has the following properties:

| | |
|---|---|
| Clearing point (T(N,I))/° C.: | 115.0 |
| Smectic to nematic transition point (T(S,N))/° C.: | <0 |
| $n_e$ (20° C., 589.3 nm): | 1.8921 |
| $\Delta n$ (20° C., 589.3 nm): | 0.3551 |
| $\epsilon_\parallel$ (20° C., 1 kHz): | 22.7 |
| $\Delta\epsilon$ (20° C., 1 kHz): | 17.5 |
| $k_1$ (20° C.)/pN: | 15.9 |
| $k_3/k_1$ (20° C.): | 1.69 |
| $V_{Freedericksz} = V_O$ (20° C.)/V: | 1.01 |

Use-example 5

A liquid crystal mixture is realized consisting of:

| Compound/Abbreviation | Concentration/mass-% |
|---|---|
| K9 | 3.0 |
| K15 | 25.0 |
| M9 | 8.0 |
| T15 | 8.0 |
| PGIP-3-N | 20.0 |
| PVG-2O-S | 12.0 |
| PVG-4O-S | 12.0 |
| PVG-5-S | 12.0 |
| Σ | 100.0 |

This mixture has the following properties:

| | |
|---|---|
| Clearing point (T(N,I))/° C.: | 110.0 |
| Smectic to nematic transition point (T(S,N))/° C.: | <0 |
| $n_e$ (20° C., 589.3 nm): | 1.9036 |
| $\Delta n$ (20° C., 589.3 nm): | 0.3652 |
| $\epsilon_\|$ (20° C., 1 kHz): | 22.8 |
| $\Delta\epsilon$ (20° C., 1 kHz): | 17.6 |
| $k_1$ (20° C.)/pN: | 16.0 |
| $k_3/k_1$ (20° C.): | 1.72 |
| $V_{Freedericksz} = V_o$ (20° C.)/V: | 1.01 |

Use-example 6

A liquid crystal mixture is realized consisting of:

| Compound/Abbreviation | Concentration/mass-% |
|---|---|
| K15 | 26.0 |
| M9 | 8.0 |
| T15 | 8.0 |
| PGIP-3-N | 20.0 |
| PVG-2O-S | 12.0 |
| PVG-4O-S | 12.0 |
| PVG-5-S | 14.0 |
| Σ | 100.0 |

This mixture has the following properties:

| | |
|---|---|
| Clearing point (T(N,I))/° C.: | 111.5 |
| $n_e$ (20° C., 589.3 nm): | 1.9081 |
| $\Delta n$ (20° C., 589.3 nm): | 0.3701 |
| $\epsilon_\|$ (20° C., 1 kHz): | 22.6 |
| $\Delta\epsilon$ (20° C., 1 kHz): | 17.5 |
| $k_1$ (20° C.)/pN: | 16.5 |
| $k_3/k_1$ (20° C.): | 1.67 |
| $V_{Freedericksz} = V_o$ (20° C.)/V: | 1.03 |

Use-example 7

A liquid crystal mixture is realized consisting of:

| Compound/Abbreviation | Concentration/mass-% |
|---|---|
| PTG-5-S | 10.0 |
| PTU-3-S | 15.0 |
| PTU-4O-S | 10.0 |
| PVG-5-S | 10.0 |
| PGU-3-S | 10.0 |
| PPU-3-S | 5.0 |
| PPU-4-S | 5.0 |
| PPU-5-S | 5.0 |
| PGIP-3-N | 15.0 |
| PPYP-4N | 15.0 |
| Σ | 100.0 |

This mixture has the following properties:

| | |
|---|---|
| Clearing point (T(N,I))/° C.: | 126.5 |
| Smectic to nematic transition point (T(S,N))/° C.: | <-10 |
| $n_e$ (20° C., 589.3 nm): | 1.9475 |
| $\Delta n$ (20° C., 589.3 nm): | 0.4016 |

Use-example 8

A liquid crystal mixture is realized consisting of:

| Compound/Abbreviation | Concentration/mass-% |
|---|---|
| PTG-5-S | 10.0 |
| PTU-3-S | 13.0 |
| PTU-4O-S | 10.0 |
| PVG-5-S | 11.0 |
| PGU-3-S | 10.0 |
| PPU-3-S | 5.0 |
| PPU-4-S | 5.0 |
| PPU-5-S | 5.0 |
| PGIP-3-N | 12.0 |
| PPYP-4N | 13.0 |
| PVG-V-S | 6.0 |
| Σ | 100.0 |

This mixture has the following properties:

| | |
|---|---|
| Clearing point (T(N,I))/° C.: | 125.0 |
| Smectic to nematic transition point (T(S,N))/° C.: | <-10 |
| $n_e$ (20° C., 589.3 nm): | 1.9623 |
| $\Delta n$ (20° C., 589.3 nm): | 0.4153 |

Use-example 9

A liquid crystal mixture is realized consisting of:

| Compound/Abbreviation | Concentration/mass-% |
|---|---|
| PG-3-AN | 8.0 |
| PU-3-AN | 7.0 |
| PU-5-AN | 7.0 |
| PPVU-2-S | 6.0 |
| PPVU-3-S | 6.0 |
| PGP-3-N | 6.0 |
| PGIP-3-N | 6.0 |
| PPYP-4N | 8.0 |
| PTP-3-S | 4.0 |
| PTG-3-S | 5.0 |
| PVG-5-S | 10.0 |
| PTPG-2-N | 4.0 |
| PPU-CL-S | 4.0 |
| PTP-2O-S | 4.0 |
| PTP-4O-S | 5.0 |
| PTG-2O-S | 5.0 |
| PTG-4O-S | 5.0 |
| Σ | 100.0 |

This mixture has the following properties:

| | |
|---|---|
| Clearing point (T(N,I))/° C.: | 135.0 |
| $n_e$ (20° C., 589.3 nm): | 1.9906 |
| Δn (20° C., 589.3 nm): | 0.4511 |

Comparative Use-example 1

A liquid crystal mixture is realized consisting of:

| Compound/Abbreviation | Concentration/mass-% |
|---|---|
| K6 | 12.0 |
| K9 | 4.0 |
| K15 | 29.6 |
| M9 | 8.8 |
| T15 | 8.0 |
| PGIP-3-N | 20.0 |
| BB21 | 5.6 |
| BCH-5 | 12.0 |
| Σ | 100.0 |

This mixture has the following properties:

| | |
|---|---|
| Clearing point (T(N,I))/° C.: | 113.0 |
| $n_e$ (20° C., 589.3 nm): | 1.8160 |
| Δn (20° C., 589.3 nm): | 0.2860 |
| ε∥ (20° C., 1 kHz): | 22.8 |
| Δε (20° C., 1 kHz): | 17.3 |

Comparative Use-example 2

A liquid crystal mixture is realized consisting of:

| Compound/Abbreviation | Concentration/mass-% |
|---|---|
| ME2N.F | 10.00 |
| PPTUI-2-4 | 8.45 |
| PPTUI-3-2 | 5.16 |
| PPTUI-3-4 | 15.82 |
| PPTUI-4-4 | 35.54 |
| PPTUI-5-2 | 7.25 |
| PPTUI-5-4 | 17.78 |
| Σ | 100.00 |

This mixture has the following properties:

| | |
|---|---|
| Clearing point (T(N,I))/° C.: | 145° C. |
| Δn (20° C., 589.3 nm): | 0.336 |
| ε∥ (20° C., 1 kHz): | 9.8 |
| Δε (20° C., 1 kHz): | 6.5 |

Comparative Use-example 3

A liquid crystal mixture is realized consisting of:

| Compound/Abbreviation | Concentration/mass-% |
|---|---|
| GGP-5-CL | 16.0 |
| PGIGI-3-CL | 6.0 |
| BCH-2F.F | 14.0 |
| BCH-3F.F | 15.0 |
| BCH-5F.F | 14.0 |
| BCH-3F.F.F | 14.0 |
| CGU-2-F | 6.0 |
| CGU-3-F | 6.0 |
| CGU-5-F | 6.0 |
| CBC-33F | 3.0 |
| Σ | 100.0 |

This mixture has the following properties:

| | |
|---|---|
| Clearing point (T(N,I))/° C.: | 81.0 |
| Smectic to nematic transition point (T(S, N))/° C.: | <−30 |
| $n_e$ (20° C., 589.3 nm): | 1.6711 |
| Δn (20° C., 589.3 nm): | 0.1603 |
| ε∥ (20° C., 1 kHz): | 14.6 |
| Δε (20° C., 1 kHz): | 9.9 |
| $k_1$ (20° C.)/pN: | 10.3 |
| $k_3 k_1$ (20° C.): | 1.09 |

What is claimed is:

1. A liquid crystal medium, comprising:

a strongly dielectrically positive liquid crystal component A, containing one or more liquid crystal compounds with a terminal isothiocyanate group, and a dielectrically positive component B containing of one or more terminally polar substituted bi- or terphenyl compounds; wherein the dielectrically positive liquid crystal component A comprises one or more compounds of formula I

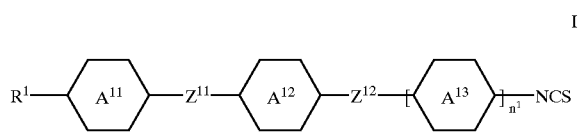

I wherein $R^1$ is n-alkyl, or n-alkoxy with 1 to 10 C-atoms, alkenyl, alkenyloxy or alkoxyalkyl with 2 to 7 C-atoms or CN, NCS, halogen, or alkyl, alkenyl, alkoxy, alkenyloxy or alkoxyalkyl substituted by one or more halogens,

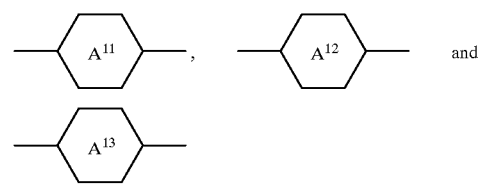

each, independently of each other, are

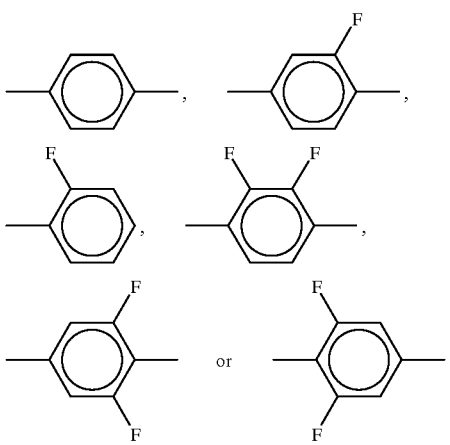

Z$^{11}$ and Z$^{12}$ each are independent of each other a single bond or trans —CH=CH—, provided that when n$^1$ is 0, Z$^{12}$ is a single bond, and n$^1$ is 0 or 1;

provided that: either, at least one of Z$^{11}$ and Z$^{12}$ is trans —CH=CH—, or at least one of the A$^{11}$, A$^{12}$ and A$^{13}$ rings is present and has two fluoro substituents on the ring and R$^1$ is n-alkyl or n-alkoxy with 1–10 C-atoms, or alkenyl, alkenyloxy or alkoxyalkyl with 2 to 7 C-atoms.

2. A liquid crystal medium according to claim 1, wherein the dielectrically positive liquid crystal component B comprises one or more compounds of formula II

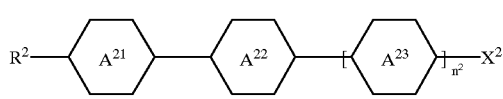

wherein

R$_2$ is n-alkyl, or n-alkoxy with 1 to 10 C-atoms, alkenyl, alkenyloxy or alkoxyalkyl with 2 to 7 C-atoms or CN, NCS, halogen, or alkyl, alkenyl, alkoxy, alkenyloxy or alkoxyalkyl substituted by one or more halogens,

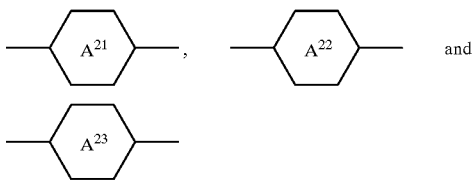

and are each independently as defined for the A$^{11}$, A$^{12}$ and A$^{13}$ rings, X$^2$ is CN, F or Cl, and n$^2$ is 0 or 1.

3. A liquid crystal medium according to claim 1, wherein component A comprises one or more compounds of formula I-1a

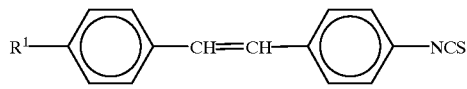

wherein

R$^1$ is n-alkyl, or n-alkoxy with 1 to 10 C-atoms, alkenyl, alkenyloxy or alkoxyalkyl with 2 to 7 C-atoms or CN, NCS, halogen, or alkyl, alkenyl, alkoxy, alkenyloxy or alkoxyalkyl substituted by one or more halogens.

4. A liquid crystal medium of claim 3, wherein R$^1$ is n-alkyl with 1 to 5 C-atoms or n-alkoxy with 1 to 4 C-atoms.

5. A liquid crystal medium according to claim 1, wherein component A comprises one or more compounds of formula I-3d:

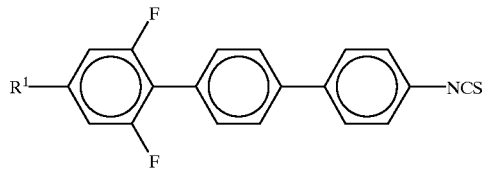

wherein

R$^1$ is n-alkyl with 1 to 5 C-atoms.

6. A liquid crystal medium according to claim 1, wherein the dielectrically positive liquid crystal component A comprises one or more compounds of formula I

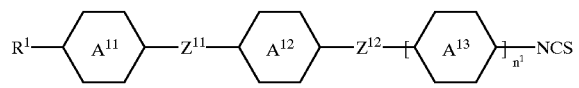

wherein

R$^1$ is n-alkyl or n-alkoxy with 1 to 7 C-atoms, or alkenyl, alkenyloxy or alkoxyalkyl with 2 to 7 C-atoms,

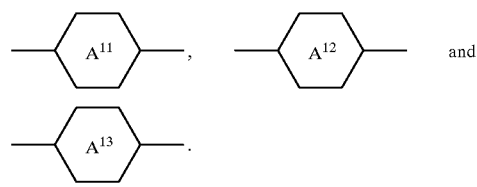

Each, independently of each other, are

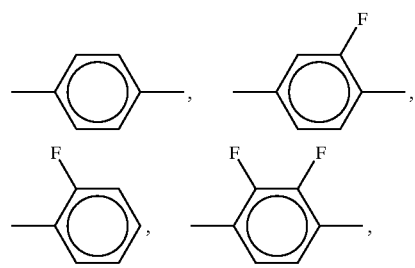

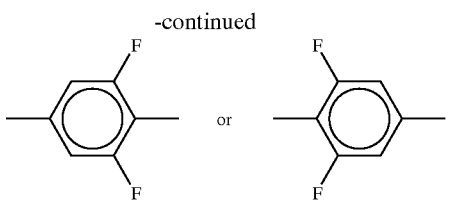

at least one of $Z^{11}$ and $Z^{12}$ is trans —CH=CH— the other one is a single bond or trans —CH=CH—, $n^1$ is 0 or 1.

7. A liquid crystal display, comprising a liquid crystal medium according to claim 1.

8. A liquid crystal display comprising a composite system which comprises a liquid crystal medium according to claim 1 and a polymer.

9. A liquid crystal display, comprising a liquid crystal medium according to claim 2.

10. A liquid crystal display comprising a composite system which comprises a liquid crystal medium according to claim 2 and a polymer.

11. A liquid crystal display according to claim 7 which is a holographic display system.

12. A liquid crystal display according to claim 8 which is a holographic display system.

13. A liquid crystal display according to claim 9 which is a holographic display system.

14. A liquid crystal display according to claim 10 which is a holographic display system.

15. A compound of formula I

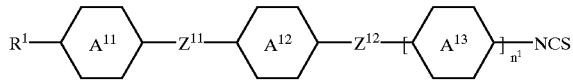

wherein $R^1$ is n-alkyl or n-alkoxy with 1 to 10 C-atoms, alkenyl, alkenyloxy or alkoxyalkyl with 2 to 7 C-atoms or CN, NCS, halogen, or alkyl, alkenyl, alkoxy, alkenyloxy or alkoxyalkyl each substituted by one or more halogens,

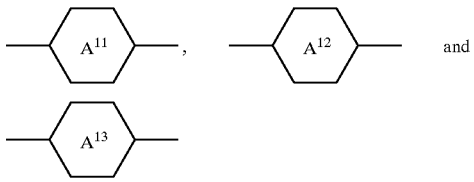

each, independently of each other are

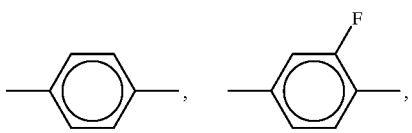

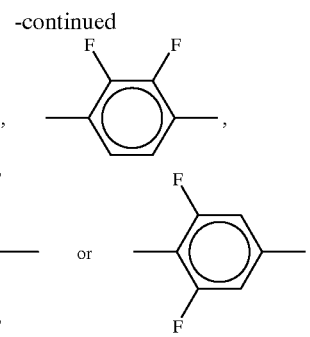

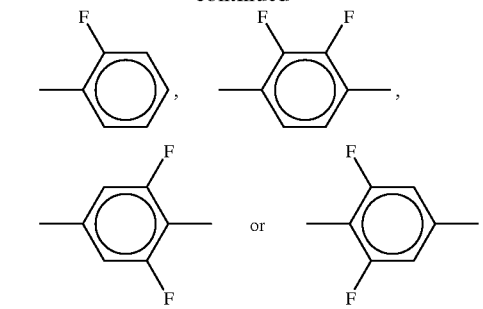

$Z^{11}$ and $Z^{12}$ each are independent of each other in a single bond or trans —CH=CH—, provided that when $n^1$ is 0, $Z^{12}$ is a single bond, and, in this case, when $A^{11}$ and $A^{12}$ are phenylene, $R^1$ is not alkyl or alkoxy with 1 C-atom, and $n^1$ is 0 or 1, and provided that at least one of $Z^{11}$ and $Z^{12}$ is trans —CH=CH— or at least one of the $A^{11}$, $A^{12}$ or $A^{13}$ phenyl rings is substituted by two fluorine atoms and $R^1$ is n-alkyl or n-alkoxy with 1–10 C-atoms or alkenyl, alkenyloxy or alkoxyalkyl with 2 to 7 C-atoms.

16. The liquid crystal medium of claim 1, wherein one or more compounds of the formula I are compounds of one of the formulae I-1, I-2 and I-3:

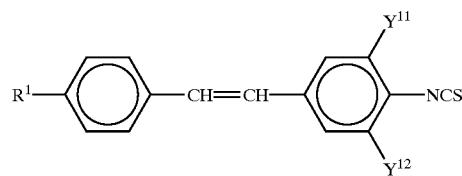

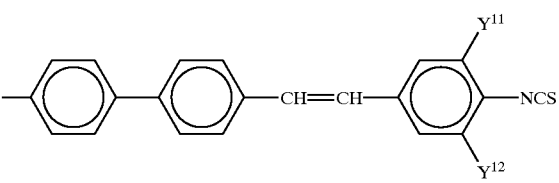

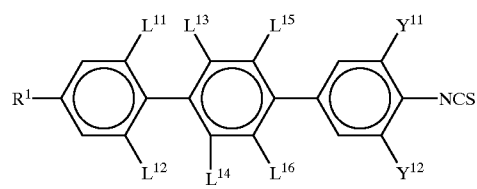

wherein $R^1$ has the meaning given, $Y^{11}$ and $Y^{12}$ are independently H or F and $L^{11}$ to $L^{16}$ are independently H or F, provided that, for compounds of the formula I-3, at least one pair of $L^{11}$ and $L^{12}$, $L^{15}$ and or $Y^{11}$ and $Y^{12}$ are both F.

17. The liquid crystal medium of claim 1, wherein one or more compounds of the formula I are compounds of one of the formulae I-1a to I-1c:

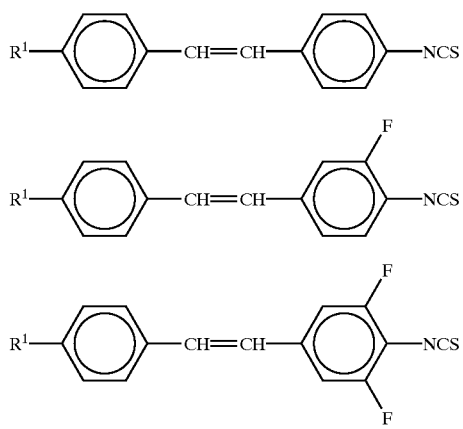

wherein $R^1$ has the meaning given.

18. The liquid crystal medium of claim 17, wherein the compound is of the formula I-1b.

19. The liquid crystal medium of claim 17, wherein the compound is of the formula I-1c.

20. The liquid crystalline medium of claim 1, wherein one or more compounds of the formula I are compounds of one of the formulae I-2a to I-2i:

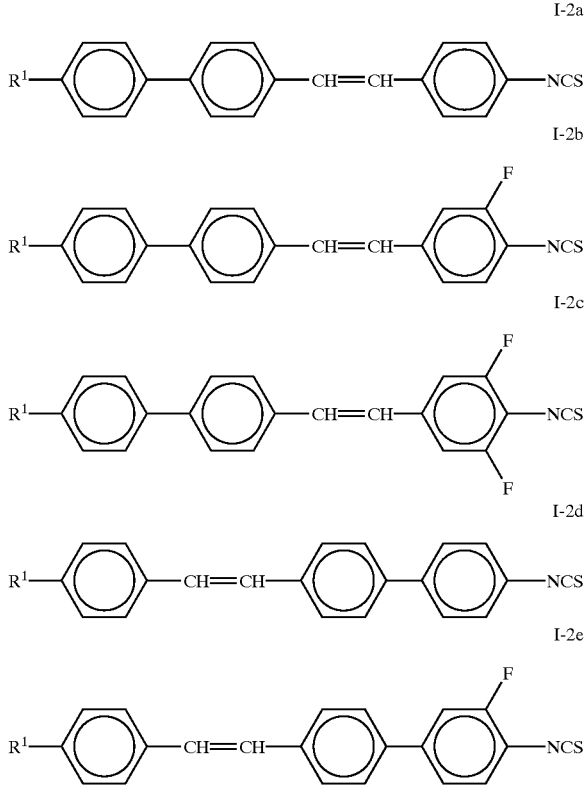

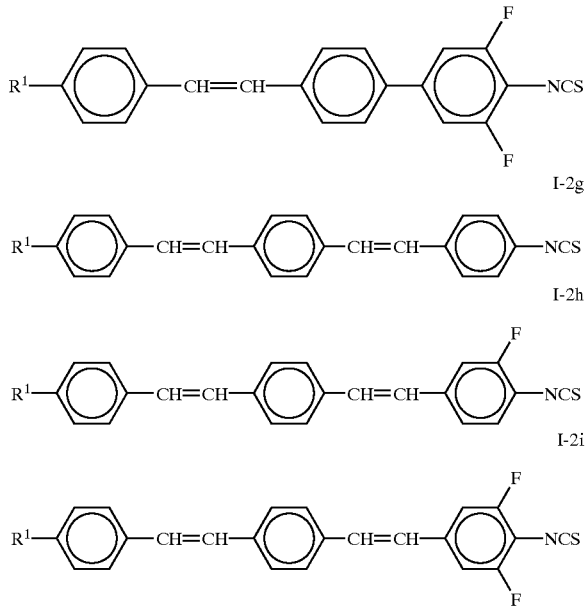

wherein $R^1$ has the meaning given.

21. The liquid crystal medium of claim 20, wherein the compound is of the formula I-2c.

22. The liquid crystal medium of claim 16, wherein the compound is of the formula I-3, wherein $L^{11}$ and $L^{12}$ are both F.

23. The liquid crystal medium of claim 16, wherein the compound is of the formula I-3, wherein $L^{15}$ and $L^{16}$ are both F.

24. The liquid crystal medium of claim 16, wherein the compound is of the formula I-3, wherein $Y^{11}$ and $Y^{12}$ are both F.

25. The liquid crystal medium of claim 16, wherein the compound is of the formula I-3, wherein each of $L^{15}$, $Y^{11}$ and $Y^{12}$ are F.

26. The liquid crystal medium of claim 1, wherein the medium has a Δn of more than 0.30 at 20° C. and 589.3 nm.

27. The liquid crystal medium of claim 1, wherein in formula I, $R^1$ is n-alkyl, n-alkoxy, alkenyl, alkenyloxy or alkoxyalkyl.

* * * * *

UNITED STATES PATENT AND TRADEMARK OFFICE
CERTIFICATE OF CORRECTION

PATENT NO. : 6,569,505 B2  
DATED : May 27, 2003  
INVENTOR(S) : Poetsch et al.

It is certified that error appears in the above-identified patent and that said Letters Patent is hereby corrected as shown below:

Column 58,  
Line 63, reads "$L^{15}$ and or," should read -- $L^{15}$ and $L^{16}$ or --

Column 60,  
Line 51, reads "An" should read -- $\Delta$n --

Signed and Sealed this

Twenty-fifth Day of May, 2004

JON W. DUDAS  
*Acting Director of the United States Patent and Trademark Office*